United States Patent
Zhao

(10) Patent No.: US 6,782,158 B2
(45) Date of Patent: Aug. 24, 2004

(54) APPARATUS AND METHOD FOR WAVELENGTH DIVISION MULTIPLEXING

(75) Inventor: Bin Zhao, Irvine, CA (US)

(73) Assignee: Cirvine Corporation, Irvine, CA (US)

( * ) Notice: Subject to any disclaimer, the term of this patent is extended or adjusted under 35 U.S.C. 154(b) by 106 days.

(21) Appl. No.: 10/263,988

(22) Filed: Oct. 2, 2002

(65) Prior Publication Data

US 2003/0072522 A1 Apr. 17, 2003

Related U.S. Application Data

(63) Continuation-in-part of application No. 10/021,472, filed on Dec. 7, 2001.
(60) Provisional application No. 60/254,389, filed on Dec. 8, 2000.

(51) Int. Cl.[7] .............................. G02B 6/28; G01B 9/02; H04S 14/02
(52) U.S. Cl. .............................. 385/24; 385/24; 398/48; 356/478
(58) Field of Search .............................. 385/14–15, 24; 398/48–65; 356/477–478

(56) References Cited

U.S. PATENT DOCUMENTS

| | | | |
|---|---|---|---|
| 5,596,661 A | 1/1997 | Henry et al. | 385/24 |
| 5,636,309 A | 6/1997 | Henry et al. | 385/129 |
| 5,852,505 A | 12/1998 | Li | 359/118 |
| 6,031,948 A | 2/2000 | Chen | 385/24 |
| 6,222,958 B1 | 4/2001 | Paiam | 385/24 |
| 6,256,433 B1 | 7/2001 | Luu et al. | 385/24 |

OTHER PUBLICATIONS

Y.P. Li, C.H. Henry, E.J. Laskowski, C.Y. Mak and H.H. Yaffe, Waveguide EDFA gain equalisation filer, Electronics Letters Nov. 9th 1995 vol. 31 No. 23 p. 2005.

*Primary Examiner*—Akm Enayet Ullah
*Assistant Examiner*—Jerry T Rahll

(57) ABSTRACT

A dispersion mitigating interleaver assembly has a first unbalanced Mach-Zehnder interferometer (MZI) assembly which includes first and second output ports and which has first transmission vs. wavelength curve and a first dispersion vs. wavelength curve. The dispersion mitigating interleaver assembly also includes a second unbalanced MZI assembly which has a second transmission vs. wavelength curve and a second dispersion vs. wavelength curve. The second unbalanced MZI assembly receives an output from one of the first and second output ports of the first unbalanced MZI assembly. The second transmission vs. wavelength curve is substantially the same as the first transmission vs. wavelength curve and the second dispersion vs. wavelength curve is substantially opposite with respect to the first dispersion vs. wavelength curve, such that dispersion is substantially cancelled by the cooperation of the first and second unbalanced MZI assemblies.

6 Claims, 22 Drawing Sheets

Odd Channels

Stage 1:
k1 = 0.7854
k2 = 2.0944
k3 = 0.3218

Stage 2:
k1 = 0.7854
k2 = 2.0944
k3 = 0.3218

Even Channels

Stage 1:
k1 = 0.7854
k2 = 2.0944
k3 = 0.3218

Stage 2:
k1 = 0.7854
k2 = 2.0944
k3 = 0.3218

Odd Channels

Stage 1:
k1 = 0.7854
k2 = 1.1071
k3 = 2.6779
k4 = 0.1419

Stage 2:
k1 = 0.7854
k2 = 1.1071
k3 = 2.6779
k4 = 0.1419

Even Channels

Stage 1:
k1 = 0.7854
k2 = 1.1071
k3 = 2.6779
k4 = 0.1419

Stage 2:
k1 = 0.7854
k2 = 1.1071
k3 = 2.6779
k4 = 0.1419

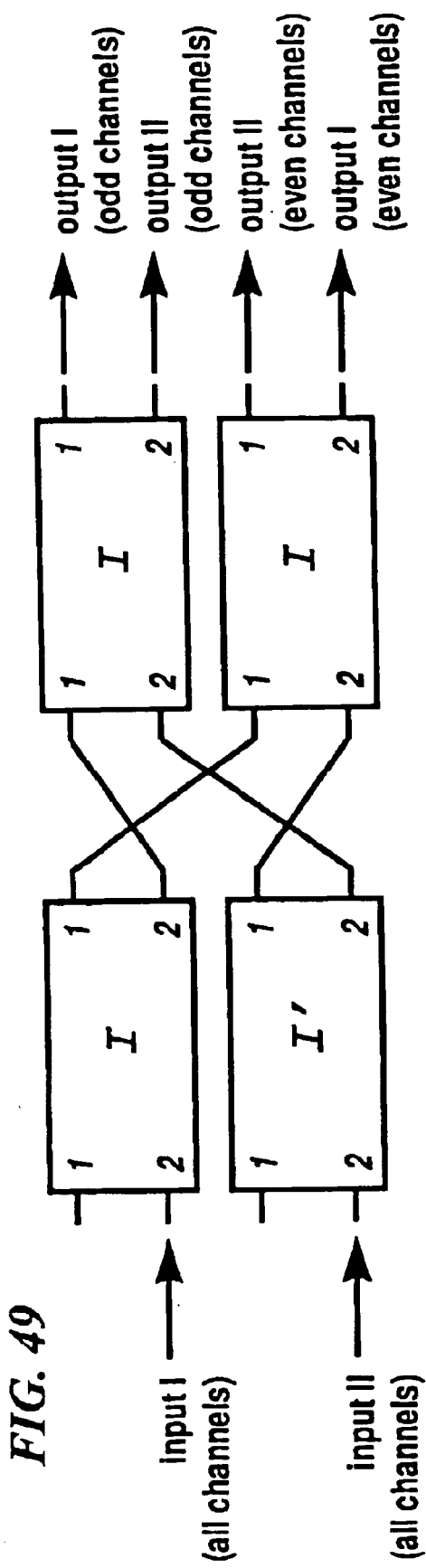
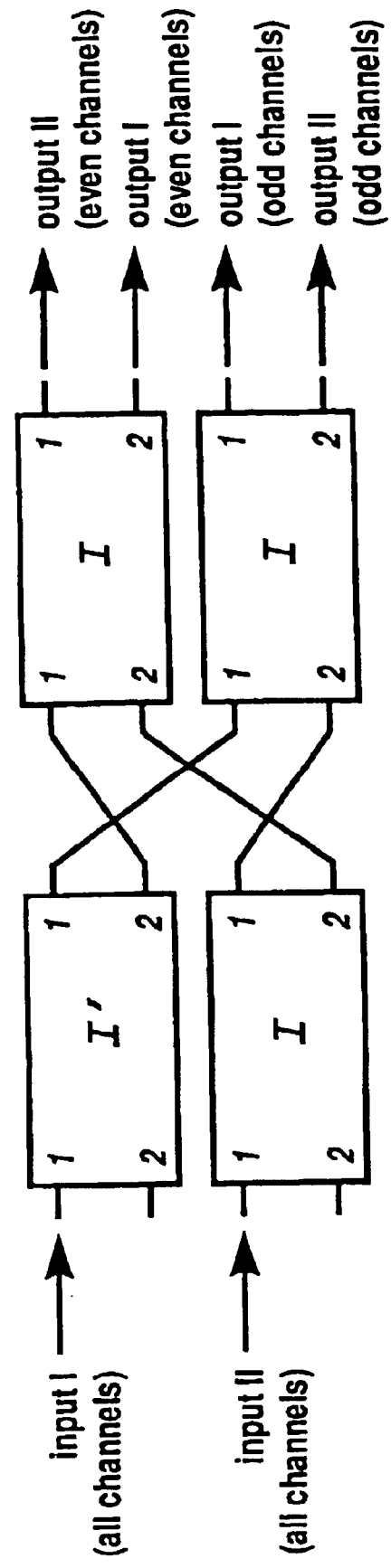
FIG. 49
FIG. 50

FIG. 54

| Matrix Elements - 2 Phase Delay | c1 | s1 | c2 | s2 | c3 | s3 | c4 | s4 |
|---|---|---|---|---|---|---|---|---|
| original interleaver | cos(k1) | sin(k1) | cos(k2) | sin(k2) | cos(k3) | sin(k3) | | |
| complementary interleaver | sin(k1) | cos(k1) | -cos(k2) | sin(k2) | sin(k3) | cos(k3) | | |
| complementary interleaver | sin(k1) | -cos(k1) | cos(k2) | sin(k2) | sin(k3) | -cos(k3) | | |

| Matrix Elements - 3 Phase Delay | c1 | s1 | c2 | s2 | c3 | s3 | c4 | s4 |
|---|---|---|---|---|---|---|---|---|
| original interleaver | cos(k1) | sin(k1) | cos(k2) | sin(k2) | cos(k3) | sin(k3) | cos(k4) | sin(k4) |
| complementary interleaver | sin(k1) | cos(k1) | -cos(k2) | sin(k2) | sin(k3) | cos(k3) | sin(k4) | -cos(k4) |
| complementary interleaver | sin(k1) | -cos(k1) | cos(k2) | sin(k2) | sin(k3) | -cos(k3) | sin(k4) | cos(k4) |

FIG. 55

| Matrix Elements - 2 Phase Delay | c1 | s1 | c2 | s2 | c3 | s3 | c4 | s4 |
|---|---|---|---|---|---|---|---|---|
| original interleaver | cos(k1) | sin(k1) | cos(k2) | sin(k2) | cos(k3) | sin(k3) | | |
| equivalent interleaver | cos(k1) | sin(k1) | cos(k2) | sin(k2) | sin(k3) | cos(k3) | | |
| equivalent interleaver | -cos(k1) | sin(k1) | -cos(k2) | sin(k2) | cos(k3) | sin(k3) | | |

| Matrix Elements - 3 Phase Delay | c1 | s1 | c2 | s2 | c3 | s3 | c4 | s4 |
|---|---|---|---|---|---|---|---|---|
| original interleaver | cos(k1) | sin(k1) | cos(k2) | sin(k2) | cos(k3) | sin(k3) | cos(k4) | sin(k4) |
| equivalent interleaver | cos(k1) | sin(k1) | cos(k2) | sin(k2) | sin(k3) | sin(k3) | sin(k4) | -cos(k4) |
| equivalent interleaver | -cos(k1) | sin(k1) | -cos(k2) | sin(k2) | cos(k3) | sin(k3) | sin(k4) | cos(k4) |

APPARATUS AND METHOD FOR WAVELENGTH DIVISION MULTIPLEXING

PRIORITY CLAIM

This Patent Application is a Continuation-In-Part of U.S. patent application Ser. No. 10/021,472, filed Dec. 7, 2001, and entitled APPARATUS AND METHOD FOR WAVELENGTH DIVISION MULTIPLEXING, the entire contents of which are hereby expressly incorporated by reference.

This Continuation-In-Part Patent Application claims the benefit of the filing dates of U.S. Provisional Patent Application Serial No. 60/254,389, filed on Dec. 8, 2000, and entitled APPARATUS AND METHOD FOR DENSE WAVELENGTH DIVISION MULTIPLEXING and U.S. patent application Ser. No. 10/021,472, filed Dec. 7, 2001, and entitled APPARATUS AND METHOD FOR WAVELENGTH DIVISION MULTIPLEXING, the entire contents of both of which are hereby expressly incorporated by reference.

FIELD OF THE INVENTION

The present invention relates generally to optical devices. The present invention relates more particularly to a high performance filter or interleaver for optical communications and the like.

BACKGROUND OF THE INVENTION

Optical communication systems which utilize wavelength-division multiplexing (WDM) and dense wavelength-division multiplexing (DWDM) technologies are well known. According to both wavelength-division multiplexing and dense wavelength-division multiplexing, a plurality of different wavelengths of light, preferably infrared light, are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, according to wavelength-division multiplexing and dense wavelength-division multiplexing technologies, a much greater amount of information can be transmitted than is possible utilizing a single wavelength optical communication system.

The individual channels of wavelength-division multiplexed or dense wavelength-division multiplexed signals must be selected or separated from one another at a receiver in order to facilitate detection and demodulation thereof. This separation or demultiplexing process can be performed or assisted by a filter or an interleaver. A similar device facilitates multiplexing of the individual channels by a transmitter.

It is important that the interleavers separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Generally, the effects of crosstalk must be compensated for by undesirably increasing channel spacing and/or reducing the communication speed, so as to facilitate reliable detection/demodulation of the signals.

Although configuring an interleaver so as to have a wide passband is generally desirable, so as to facilitate the filtering of signals which have drifted somewhat from their nominal center wavelength, the use of such wider passbands introduces the possibility for undesirably large dispersion being introduced into a filtered channel. Typically, the dispersion introduced by a birefringent filter or interleaver increases rapidly as the channel spacing is reduced and as a channel moves away from its nominal center wavelength. Thus, as more channel wavelength error is tolerated in a birefringent filter or interleaver, greater dispersion values are likely to be introduced.

As those skilled in the art will appreciate, excessive dispersion limits the ability to reliably demodulate such optical signals. Therefore, dispersion tends to place a limit on how closely channels can be spaced in an optical communication system and thus tends to limit the efficiency of the utilization of available bandwidth.

As channel usage inherently increases over time, the need for efficient utilization of available bandwidth becomes more important. Therefore, it is highly undesirable to increase channel spacing and/or to reduce communication speed in order to compensate for the effects of crosstalk and dispersion. Moreover, it is generally desirable to decrease channel spacing and to increase communication speed so as to facilitate the communication of a greater quantity of information utilizing a given bandwidth.

Modern dense wavelength-division multiplexed (DWDM) optical communications and the like require that network systems offer an ever-increasing number of channel counts, thus mandating the use of a narrower channel spacing in order to accommodate the increasing number of channel counts. The optical interleaver, which multiplexes and demultiplexes optical channels with respect to the physical media, i.e., optical fiber, offers a potential upgrade path, so as to facilitate scalability in both channel spacing and number of channel counts in a manner which enhances the performance of optical communication networks.

As a multiplexer, an interleaver can combine two streams of optical signals, wherein one stream contains odd channels and the other stream contains even channels, into a single, more densely spaced optical signal stream. As a demultiplexer, an interleaver can separate a dense signal stream into two, wider spaced streams, wherein one stream contains the odd channels and the other stream contains the even channels. Thus, the interleaver offers scalability which allows contemporary communication technologies that perform well at wider channel spacing to address narrower, more bandwidth efficient, channel spacings.

There are four basic types of interleavers suitable for multiplexing and demultiplexing optical signals. These include birefringent filters, thin-film dielectric devices, planar waveguides, and fiber-based devices. All of these contemporary interleaving technologies suffer from substantial limitations with respect to channel spacing, dispersion, insertion loss, channel isolation, temperature stability, cost, reliability and flexibility. Thus, there is a need to provide an optical interleaver which can overcome or mitigate at least some of the above-mentioned limitations.

SUMMARY OF THE INVENTION

The present invention specifically addresses and alleviates the above-mentioned deficiencies associated with the prior art. More particularly, the present invention comprises a dispersion mitigating interleaver assembly comprising a first unbalanced Mach-Zehnder interferometer assembly which includes first and second output ports and which has a first transmission vs. wavelength curve and a first dispersion vs. wavelength curve. The dispersion mitigating interleaver assembly also includes a second unbalanced Mach-Zehnder interferometer assembly which has a second transmission vs. wavelength curve and a second dispersion vs. wavelength curve. The second unbalanced Mach-Zehnder interferometer assembly receives an output from one of the first and second output ports of the unbalanced Mach-Zehnder interferometer assembly. The second transmission vs. wavelength curve is substantially the same as the first transmission vs. wavelength curve and the second dispersion vs. wavelength curve is substantially opposite with respect to the first dispersion vs. wavelength curve, such that dispersion is substantially cancelled by the cooperation of the first and second unbalanced Mach-Zehnder interferometer assemblies.

These, as well as other advantages of the present invention, will be more apparent from the following description and drawings. It is understood that changes in the specific structure shown and described may be made within the scope of the claims without departing from the spirit of the invention.

BRIEF DESCRIPTION OF THE DRAWINGS

These, and other features, aspects and advantages of the present invention will be more fully understood when consider with respect to the following detailed description, appended claims and accompanying drawings, wherein:

FIGS. 47–53 are block diagrams showing alternative configurations of two-stage interleavers using MZI assemblies for simultaneously interleaving two independent sets of signals;

FIG. 54 is a table showing exemplary matrix elements for complementary interleaver elements; and FIG. 55 is another table showing exemplary matrix elements for equivalent interleaver elements.

DESCRIPTION OF THE INVENTION

The detailed description set forth below in connection with the appended drawings is intended as a description of the presently preferred embodiments of the invention and is not intended to represent the only forms in which the present invention may be constructed or utilized. The description sets forth the functions of the invention and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
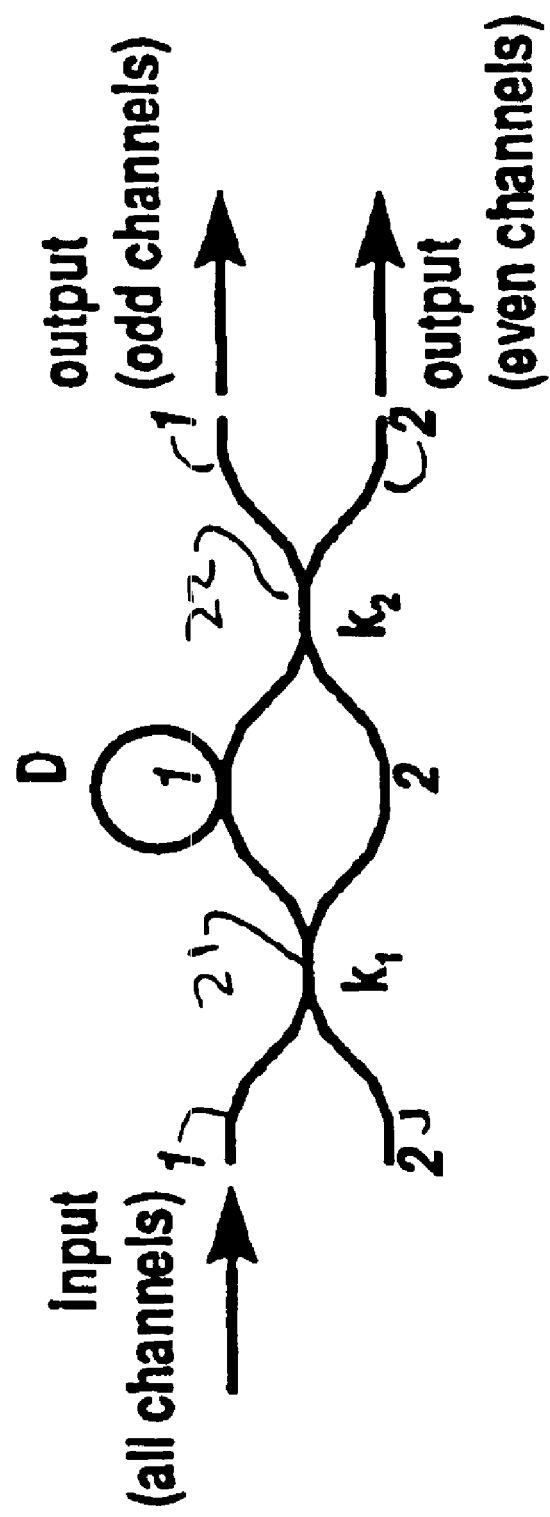
FIG. 1 is a schematic diagram of an unbalanced Mach-Zehnder interferometer having two couplers, which may be used to construct an interleaver.

An unbalanced Mach-Zehnder interferometer (MZI) can be used to construct an interleaver for wavelength division multiplexing (WDM) or dense wavelength division multiplexing (DWDM). A typical layout of such a set-up constructed of optical fibers is schematically shown in FIG. 1. Two optical fibers 1, and 2, have different optical path lengths (such as to introduce relative phase delay D along one path) and are connected by two couplers, 21 and 22, with coupling coefficients $k_1$ and $k_2$, respectively. Such a two-port coupler can be obtained by fusing together two optical fibers along an interior portion thereof so that light in one fiber can enter and interact with light in the other fiber at the fused region and interact with light therein according to well-known principles. Generally, for a two-port coupler, the outputs optical fields and the input optical fields are related by a 2×2 transfer matrix T(k):

$$\begin{bmatrix} E_{1o} \\ E_{2o} \end{bmatrix} = T(k) \begin{bmatrix} E_{1i} \\ E_{2i} \end{bmatrix} = \begin{bmatrix} \cos(k) & -i\sin(k) \\ -i\sin(k) & \cos(k) \end{bmatrix} \begin{bmatrix} E_{1i} \\ E_{2i} \end{bmatrix} = \begin{bmatrix} c & -is \\ -is & c \end{bmatrix} \begin{bmatrix} E_{1i} \\ E_{2i} \end{bmatrix} \quad (1)$$

where $E_{1i}$ and $E_{2i}$ are the coupler input optical field amplitudes, $E_{1o}$, and $E_{2o}$, are the output optical field amplitudes, k is the coupling coefficient, and the straight-through and the cross-port transmission are c=cos(k) and −is=−isin(k), respectively. The power coupling ratio is $\sin^2$(k). For an input on one port, the power coupled to the cross-port is $\sin^2(k)$ times the input power. In FIG. 1, the phase delay D schematically represents the optical field phase difference induced by the optical path difference between fiber 1 and fiber 2. The optical path difference can be obtained by using the same kind of fibers of two different lengths, or two fibers of the same length but with different refractive indices, or a combination of both. A 2×2 transfer matrix T(D) can be used to characterize the relationship between the output optical fields and the input optical fields, which is influenced by the relative phase delay D:

$$\begin{bmatrix} E_{1o} \\ E_{2o} \end{bmatrix} = T(D) \begin{bmatrix} E_{1i} \\ E_{2i} \end{bmatrix} = \begin{bmatrix} e^{-iD} & 0 \\ 0 & 1 \end{bmatrix} \begin{bmatrix} E_{1i} \\ E_{2i} \end{bmatrix} \quad (2)$$

It is worthwhile to note that the value for phase difference D can be either positive or negative. If the optical path in fiber 1 is larger, then D>0. Conversely, if the optical path in fiber 2 is larger, D<0. The absolute value of the phase difference D determines the channel wavelengths of the interleaver shown in FIG. 1.

It is worth noting that the single stage (wherein the stage has two couplers) unbalanced MZI of FIG. 1 does not introduce any dispersion into the signals interleaved thereby. Rather, it is only multiple stage MZI interleavers (constructed from a plurality of such unbalanced MZIs) that contribute substantial undesirable dispersion. According to one aspect of the present invention, such multiple stage MZI interleavers are configured so as to substantially mitigate dispersion (provide substantially zero dispersion). As discussed below, the transmission characteristics of such single stage MZI interleavers are frequently inadequate for providing desired performance, thereby necessitating the construction of multiple stage MZI interleavers.

Figure 2:
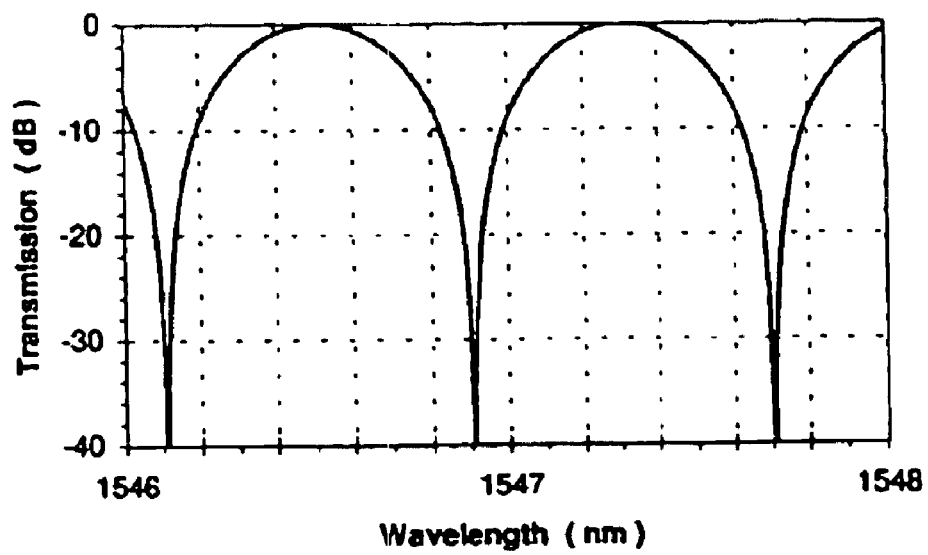
FIG. 2 is a transmission vs. wavelength chart for a 50 GHz interleaver (such as an interleaver constructed using the two-coupler unbalanced Mach-Zehnder interferometer of FIG. 1) showing one set of channels (e.g., the odd channels) therefor.
Figure 3:
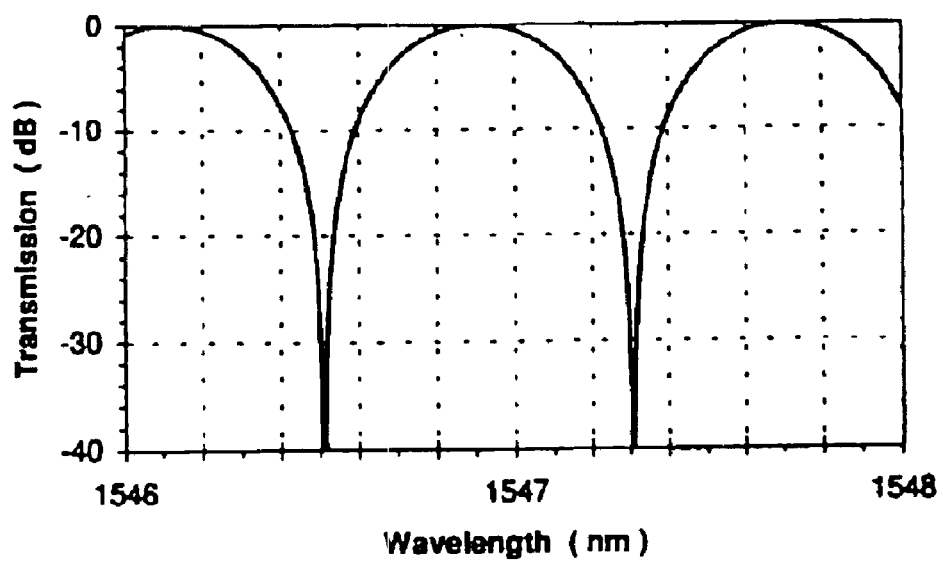
FIG. 3 is a transmission vs. wavelength chart for a 50 GHz interleaver (such as an interleaver constructed using the two-coupler unbalanced Mach-Zehnder interferometer of FIG. 1) showing another set of channels (e.g., the even channels) therefor.

FIG. 2 and FIG. 3 show the transmission as a function of wavelength for output port 1 and output port 2, respectively, for the case that an optical beam enters the single stage MZI interleaver from input port 1 as shown in FIG. 1. 3-dB couplers are used (i.e., the power coupling ratio $\sin^2(k_1)$=0.5 and $\sin^2(k_2)$=0.5). FIGS. 2 and 3 show the functionality of the interleaver as to sort one set of signals to output port 1 (i.e., the odd channels) and another set of signal to output port 2 (i.e., the even channels), respectively. It is clear that the channel spacings are increased by the interleaver.

However, one drawback for the interleaver shown in FIG. 1 is the non-flatness in passband and the narrowness of the stopband. Due to the limitations in carriers (channel wavelengths) and passband/stopband stability, it is desirable to have interleavers which have flat and wide passbands and wide stopbands.

Figure 4:
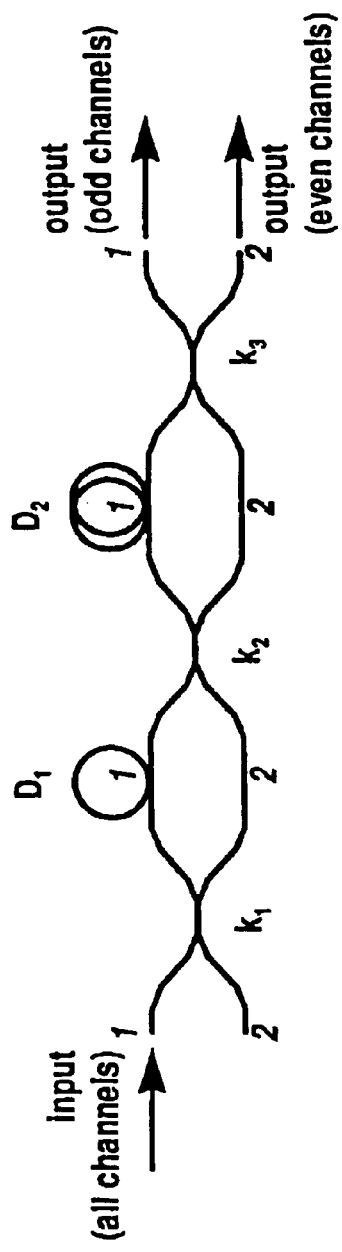
FIG. 4 is a schematic diagram of an unbalanced Mach-Zehnder interferometer (MZI) assembly which may be used to construct an interleaver, the MZI assembly having three couplers and exhibiting enhanced passband and stopband characteristics with respect to the two-coupler interleaver of FIG. 1.
Figure 5:
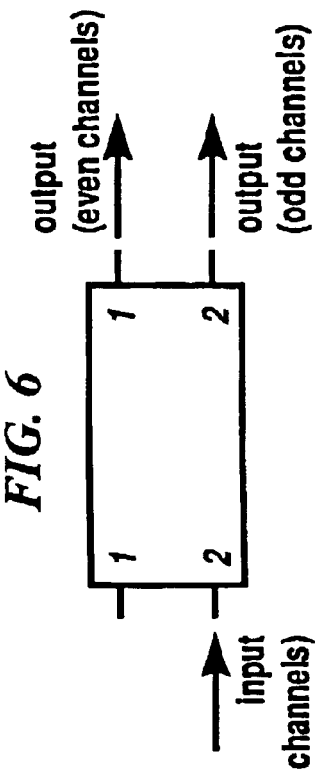
FIG. 5 is a block diagram of an unbalanced MZI assembly according to FIG. 4, showing the distribution of output channels for an input at the first input port thereof.

The apparatus of an MZI assembly consisting of two phase delay elements ($D_1$ and $D_2$) shown in FIG. 4 can be used to improve the passband and stopband characteristics of the interleavers where three couplers are used and coupling coefficients are $k_1$ $k_2$, $k_3$. In general, adding more phase delay elements (and adding more couplers correspondingly) provides enhanced transmission characteristics, as discussed below. FIG. 5 shows the case when the input is provided to input port 1 and FIG. 6 shows the case where the input is provided to input port 2.

Generally, when an input is provided to an interleaver of an MZI assembly, the odd channel output will be provided on one output port and the even channel output will be provided on the other output port. When the input is provided to the other input port of the interleaver, the output ports for the odd channels and the even channels will swap. The description regarding an input signal going to a particular input port, output odd channels and output even channels going to particular output ports, respectively, for an interleaver is called channelization in the following. FIG. 5 and FIG. 6 show an example of channelization.

Figure 6:
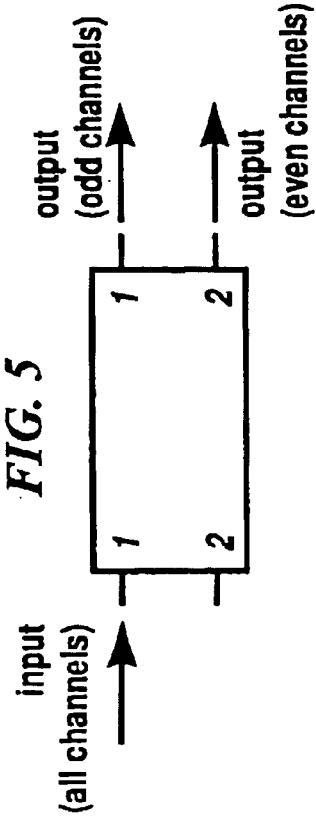
FIG. 6 is a block diagram of an unbalanced MZI assembly according to FIG. 4, showing the distribution of output channels for an input at the second input port thereof.

Referring now to FIGS. 5 and 6, the channelization for input signals being provided on a given input port is shown. More particularly, as shown in FIG. 5, when input signals are provided to input port 1, the odd channels are output on output port 1 and the even channels are output on output port 2. As shown in FIG. 6, when input signals are provided on input port 2, the even channels are output on output port 1 and the odd channels are output on output port 2. However, it is possible to define the channelization for an interleaver of an MZI assembly such that the output port for odd channels and the output port for even channels of FIGS. 5 and 6 are reversed.

By Eqs. (1) and (2) above, the output optical fields and the input optical fields are related by:

$$\begin{bmatrix} E_{1o} \\ E_{2o} \end{bmatrix} = T(k_3)T(D_2)T(k_2)T(D_1)T(k_1) \begin{bmatrix} E_{1i} \\ E_{2i} \end{bmatrix} \quad (3)$$

Figure 7:
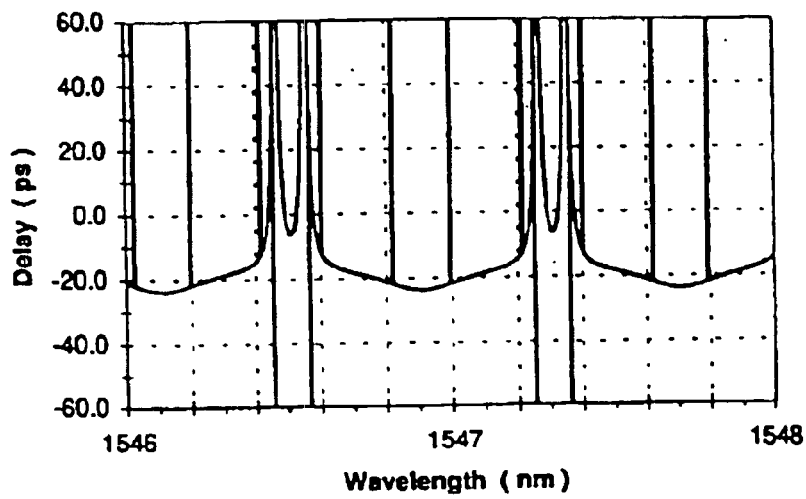
FIG. 7 is a chart showing the time delay (also called group delay or delay) vs. wavelength for one of the two sets of interleaved channels (the odd channels); in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 2.0944, and $k_3$ equals 0.3218.
Figure 8:
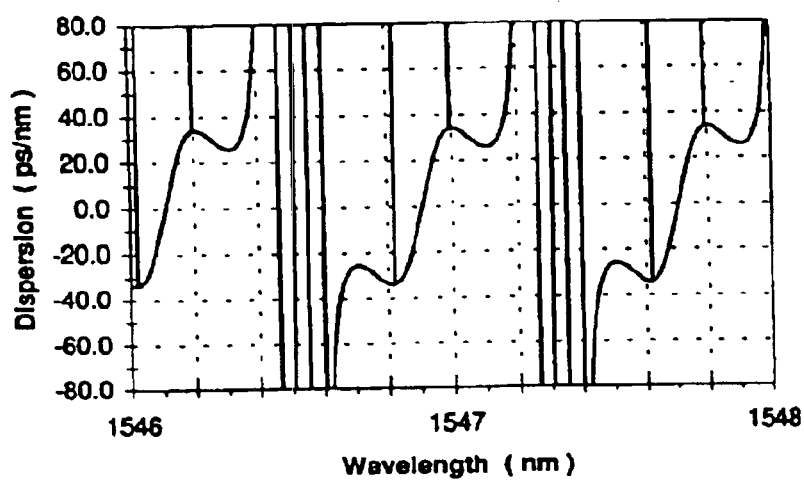
FIG. 8 is a chart showing the dispersion vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 2.0944, and $k_3$ equals 0.3218.
Figure 9:
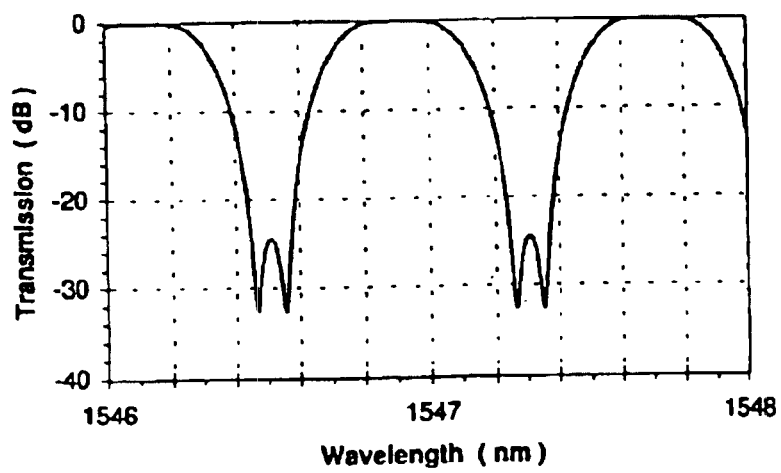
FIG. 9 is a chart showing the transmission vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 2.0944, and $k_3$ equals 0.3218.

From Eq. (3), various interleaver properties can be obtained. FIGS. 7–9 show the time delay (also called group delay or delay), dispersion and transmission, respectively, as a function of wavelength for one of the two sets of interleaved channels (e.g., the odd channels) in an exemplary 50 GHz interleaver constructed using three-coupler unbalanced MZI assembly as shown in FIG. 4 when the optical signals enter the interleaver at input port 1 as shown in FIG. 5. For the 50 GHz interleaver, the values for the coupling coefficients $k_1$, $k_2$, $k_3$ are 0.7854, 2.0944, 0.3218, respectively; $D_1$=Γ, $D_2$=2Γ; and the Γ value determines the channel wavelength of the interleaver.

Figure 10:
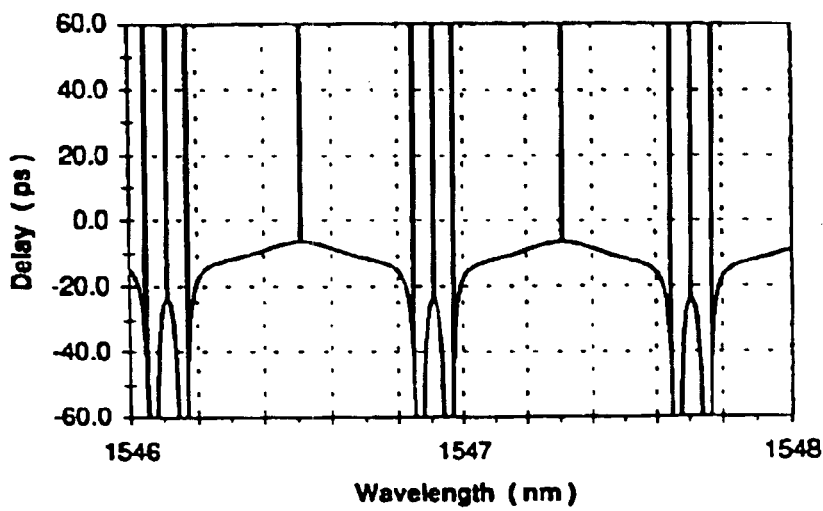
FIG. 10 is a chart showing the delay vs. wavelength for the other of the two sets of interleaved channels (the even channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 2.0944, and $k_3$ equals 0.3218.
Figure 11:
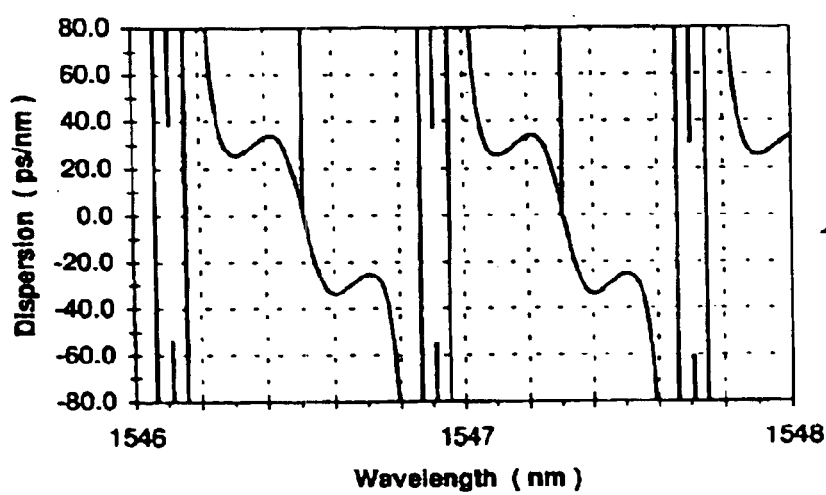
FIG. 11 is a chart showing the dispersion vs. wavelength for the other of the two sets of interleaved channels (the even channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 2.0944, and $k_3$ equals 0.3218.
Figure 12:
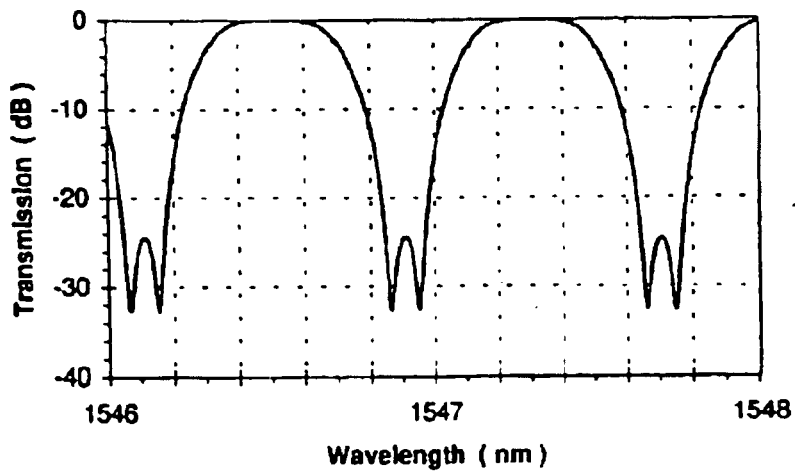
FIG. 12 is a chart showing the transmission vs. wavelength for other of the two sets of interleaved channels (the even channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 2.0944, and $k_3$ equals 0.3218.
Figure 13:
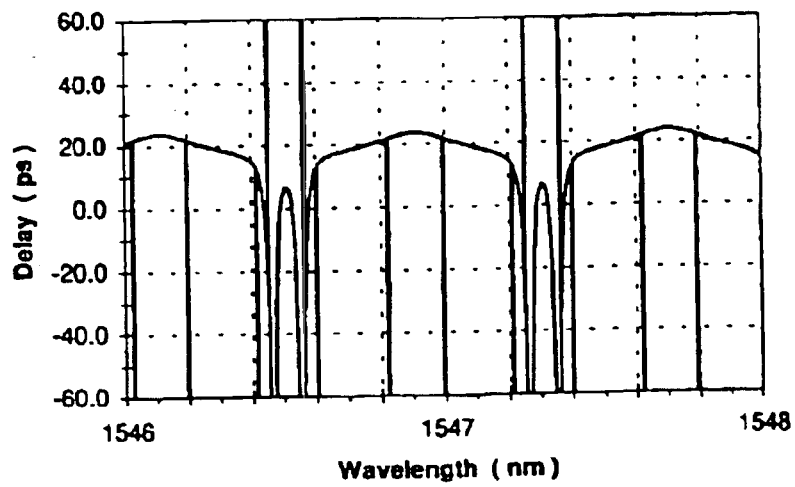
FIG. 13 is a chart showing the delay vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 2 as shown in FIG. 6 and wherein $k_1$ equals 0.7854, $k_2$ equals 2.0944, and $k_3$ equals 0.3218.

Similarly, the corresponding time delay, dispersion and transmission as a function of wavelength for the other one of the two sets of interleaved channels (e.g., the even channels) are shown in FIGS. 10–12 for the exemplary 50 GHz interleaver using three-coupler MZI assembly as shown in FIG. 4 when the optical signals enter the interleaver at input port 1 as shown in FIG. 5. As shown by the transmission curves in FIGS. 9 and 12, much improved passband and stopband characteristics can be obtained (in comparison to FIGS. 2 and 3). However, the dispersion increases very rapidly as the wavelength moves away from the center wavelength of the passband. In practical applications, the channel wavelength cannot always be well controlled at passband center due to various limitations in devices and system. The channel wavelength deviation can lead to significant dispersion and degrade signal quality.

Figure 31:
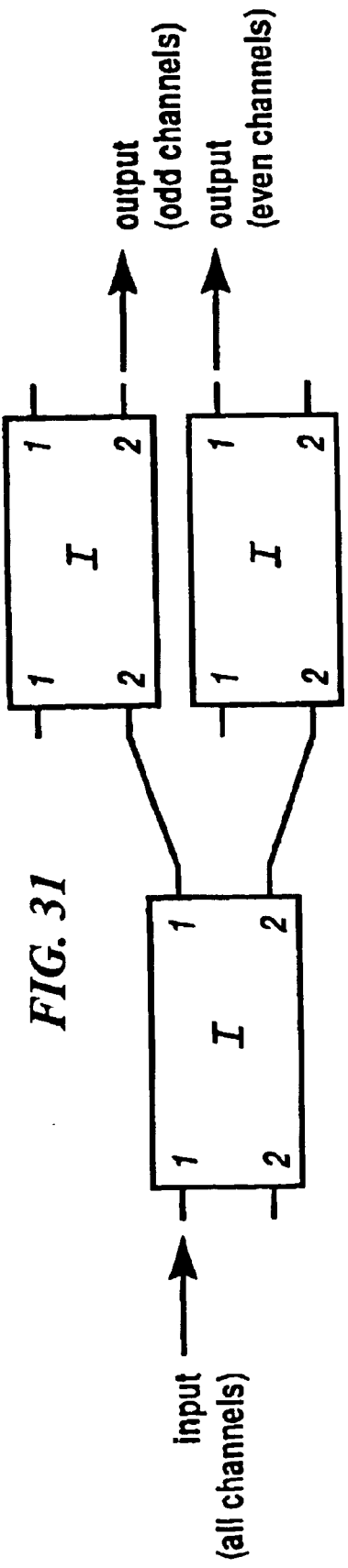
FIG. 31 is a block diagram showing three unbalanced MZI assemblies configured to form an interleaver, wherein an input is provided to the first input port of the first unbalanced MZI assembly, the first output of the first unbalanced MZI assembly is provided to the second input port of the second unbalanced MZI assembly and the second output from the first unbalanced MZI assembly is provided to the second input port of the third unbalanced MZI assembly.
Figure 34:
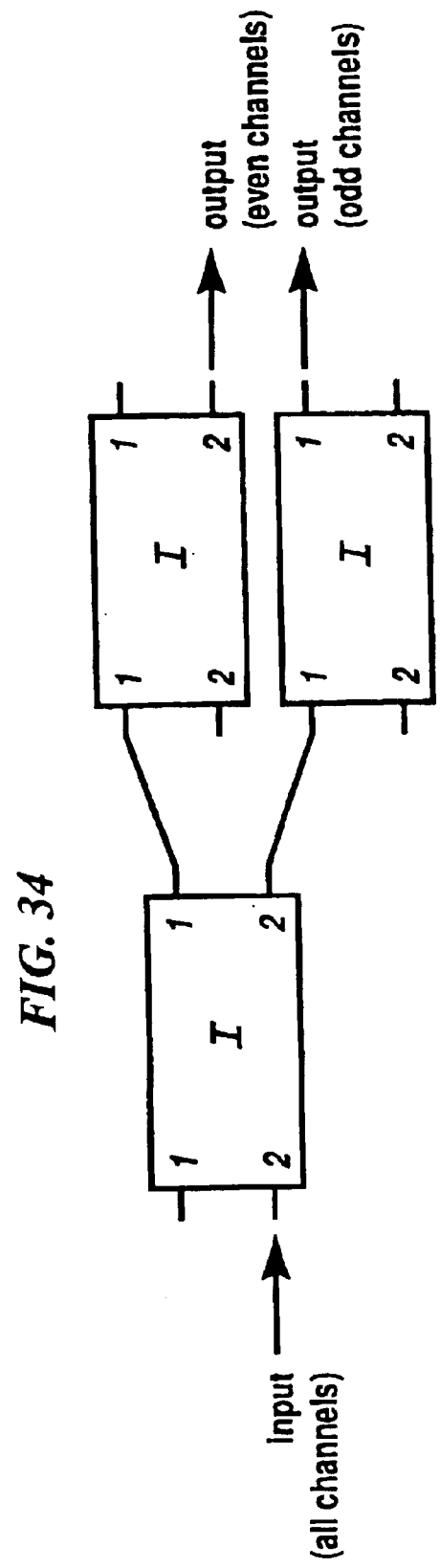
FIG. 34 is a block diagram showing three unbalanced MZI assemblies configured to form an interleaver, wherein an input is provided to the second input port of the first unbalanced MZI assembly, the first output of the first unbalanced MZI assembly is provided to the first input port of the second unbalanced MZI assembly and the second output from the first unbalanced MZI assembly is provided to the first input port of the third unbalanced MZI assembly.

In accordance with one embodiment of present invention, three identical interleaver elements are connected as shown in FIG. 31 or FIG. 34, so as to construct a two-stage interleaver using unbalanced MZI assemblies. Each interleaver element (I) corresponds to either an interleaver having two phase delay elements as shown in FIG. 4 or an interleaver of three or more phase delay elements so as to provide enhanced transmission characteristics. The corresponding ports for input, output for odd channels and even channels are exemplarily shown in FIGS. 31 and 34. The first stage of the interleaver contains one interleaver element (an unbalanced MZI assembly) which separates the odd channels and the even channels. The second stage contains two interleaver elements (two unbalanced MZI assemblies), one for the odd channels and other for the even channels for dispersion compensation. FIGS. 35–40 show the time delay, dispersion and transmission as a function of wavelength for the odd channels (FIGS. 35–37) and the even channels (FIGS. 38–40), respectively, for an exemplary interleaver (50 GHz) using three-coupler MZI assemblies with configuration shown in FIGS. 31 and 34. The exemplary values for the coupling coefficients for the interleaver in stage 1 and the two interleavers in stage 2 are also shown on the FIGS. 35 and 38.

Figure 14:
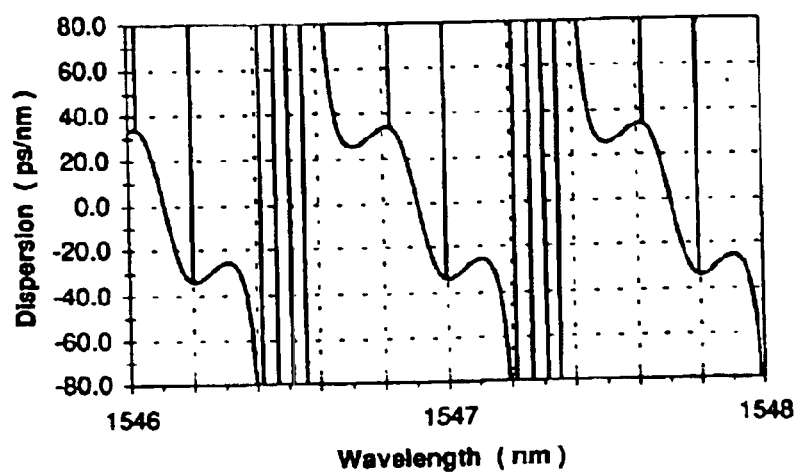
FIG. 14 is a chart showing the dispersion vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 2 as shown in FIG. 6 and wherein $k_1$ equals 0.7854, $k_2$ equals 2.0944, and $k_3$ equals 0.3218.
Figure 15:
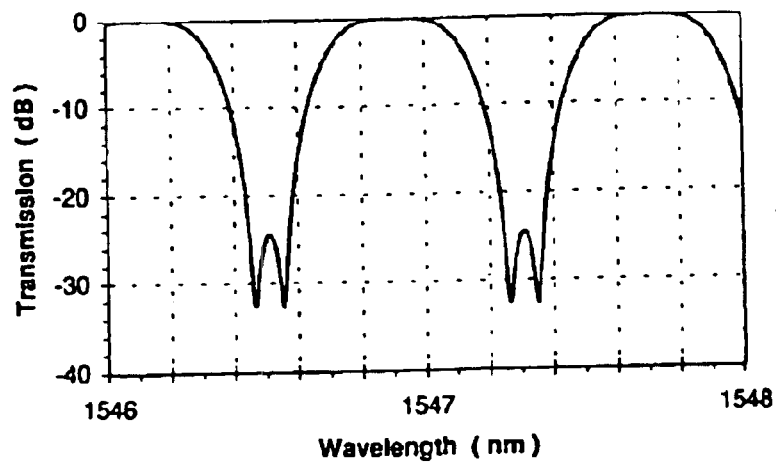
FIG. 15 is a chart showing the transmission vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 2 as shown in FIG. 6 and wherein $k_1$ equals 0.7854, $k_2$ equals 2.0944, and $k_3$ equals 0.3218.
Figure 16:
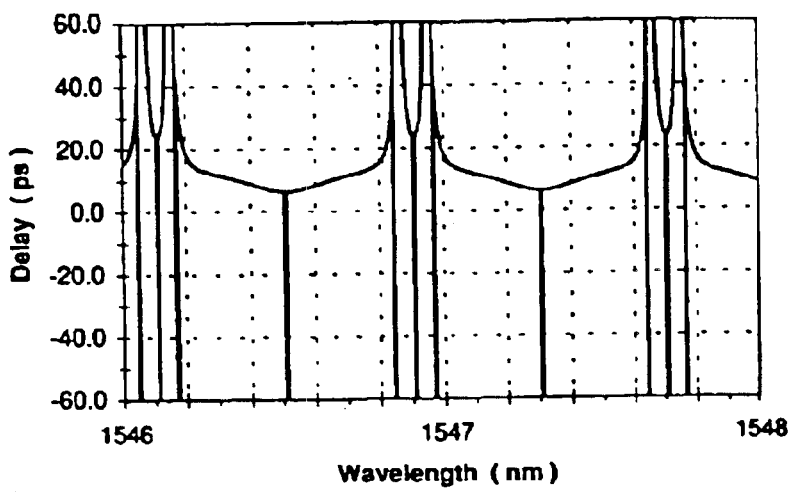
FIG. 16 is a chart showing the delay vs. wavelength for the other of the two sets of interleaved channels (the even channels) in an exemplary 50 GHz interleaver constructed using the three-coupler unbalanced MZI assembly of FIG. 4, wherein the optical signals enter the interleaver at input port 2 as shown in FIG. 6 and wherein $k_1$ equals 0.7854, $k_2$ equals 2.0944, and $k_3$ equals 0.3218.
Figure 17:
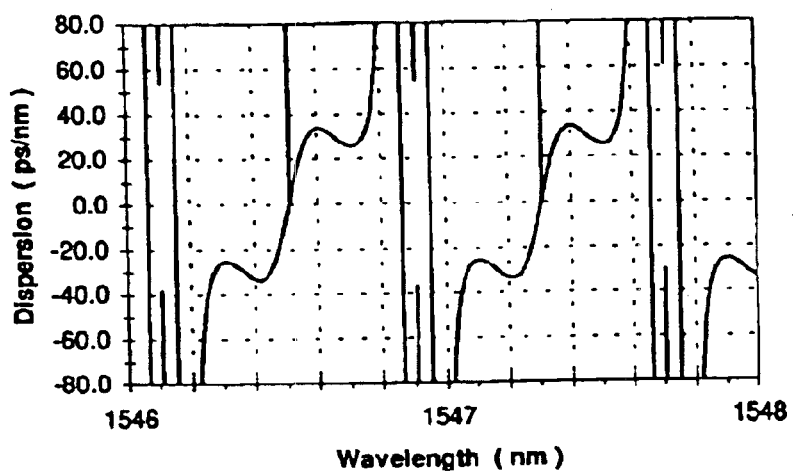
FIG. 17 is a chart showing the dispersion vs. wavelength for the other of the two sets of interleaved channels (the even channels) in an exemplary 50 GHz interleaver constructed using the three-coupler unbalanced MZI assembly of FIG. 4, wherein the optical signals enter the interleaver at input port 2 as shown in FIG. 6 and wherein $k_1$ equals 0.7854, $k_2$ equals 2.0944, and $k_3$ equals 0.3218.
Figure 18:
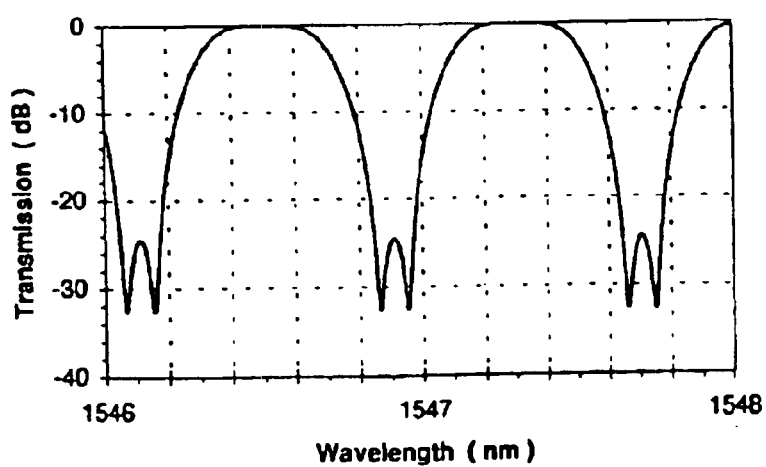
FIG. 18 is a chart showing the transmission vs. wavelength for other of the two sets of interleaved channels (the even channels) in an exemplary 50 GHz interleaver constructed using the three-coupler unbalanced MZI assembly of FIG. 4, wherein the optical signals enter the interleaver at input port 2 as shown in FIG. 6 and wherein $k_1$ equals 0.7854, $k_2$ equals 2.0944, and $k_3$ equals 0.3218.

In the following, we show how this embodiment can lead to zero or nearly zero dispersion. FIGS. 13–15 and FIGS. 16–18 show the time delay, dispersion and transmission as a function of wavelength for the odd channels and the even channels, respectively, for a 50 GHz interleaver constructed using a three-coupler unbalanced MZI assembly as shown in FIG. 4, where $D_1=\Gamma$ and $D_2=2\Gamma$, $k_1$, $k_2$, $k_3$, are 0.7854, 2.0944, 0.3218, respectively, when the optical signals enter the interleaver from input port 2 as shown in FIG. 6. In comparison to the original characteristics shown in FIGS. 10–12 and FIGS. 13–15, when input is at input port 1, the dispersion in the new case (input at port 2), as shown in FIG. 14 and FIG. 17, has an opposite value in comparison to the original case as shown in FIG. 8 and FIG. 11 for each corresponding set of interleaved channels (i.e., for odd channels and for even channels). The two dispersion values canceled with each other. If optical beams pass through two 50 GHz (other channel spacing is possible) interleavers sequentially, where the two interleavers have been designed such that they have substantially the same transmission and flipped dispersion with each other for each channel as shown above, the dispersion cancels with each other and zero or nearly zero dispersion is obtained.

Figure 35:
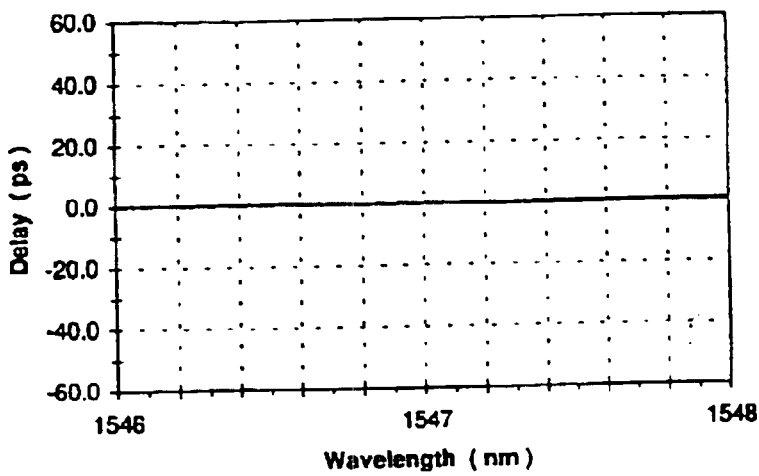
FIG. 35 is a chart showing the delay vs. wavelength for one of the two sets of interleaved channels (the odd channels) in an exemplary 50 GHz two-stage interleaver constructed according to FIG. 31 or FIG. 34 and using the three-coupler unbalanced MZI assembly of FIG. 4, wherein the optical signals enter the interleaver as shown in FIG. 31 or FIG. 34 and wherein for stage 1 $k_1$ equals 0.7854, $k_2$ equals 2.0944, and $k_3$ equals 0.3218 and for stage 2 $k_1$ equals 0.7854, $k_2$ equals 2.0944, and $k_3$ equals 0.3218.
Figure 36:
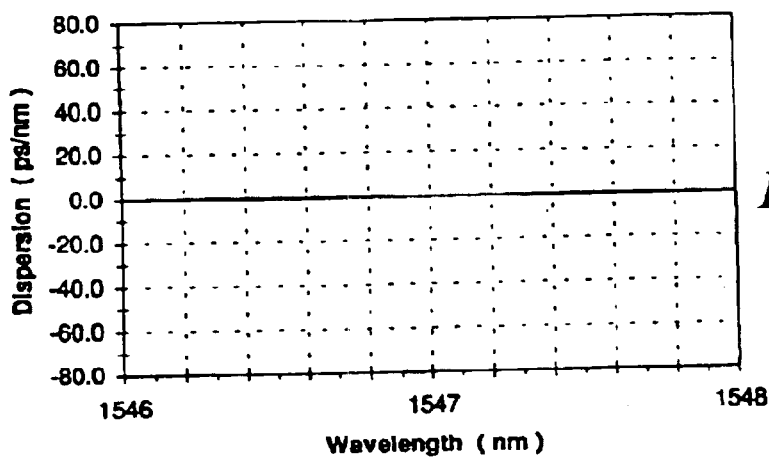
FIG. 36 is a chart showing the dispersion vs. wavelength for one of the two sets of interleaved channels (the odd channels) in an exemplary 50 GHz two-stage interleaver constructed according to FIG. 31 or FIG. 34 and using the three-coupler unbalanced MZI assembly of FIG. 4, wherein the optical signals enter the interleaver as shown in FIG. 31 or FIG. 34 and wherein for stage 1 $k_1$ equals 0.7854, $k_2$ equals 2.0944, and $k_3$ equals 0.3218 and for stage 2 $k_1$ equals 0.7854, $k_2$ equals 2.0944, and $k_3$ equals 0.3218.
Figure 37:
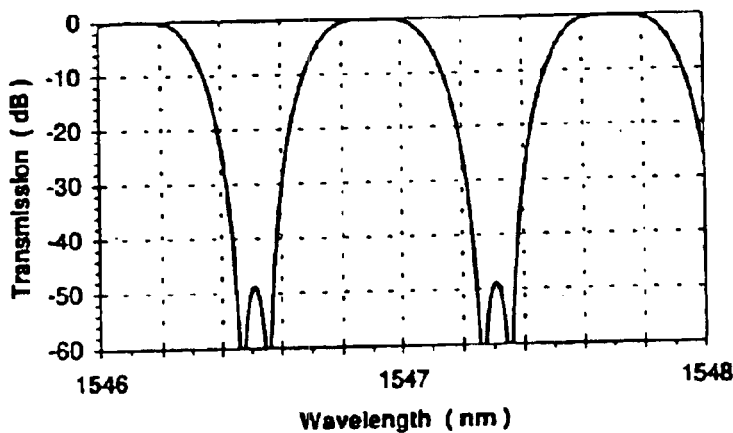
FIG. 37 is a chart showing the transmission vs. wavelength for one of the two sets of interleaved channels (the odd channels) in an exemplary 50 GHz two-stage interleaver constructed according to FIG. 31 or FIG. 34 and using the three-coupler unbalanced MZI assembly of FIG. 4, wherein the optical signals enter the interleaver as shown in FIG. 31 or FIG. 34 and wherein for stage 1 $k_1$ equals 0.7854, $k_2$ equals 2.0944, and $k_3$ equals 0.3218 and for stage 2 k, equals 0.7854, $k_2$ equals 2.0944, and $k_3$ equals 0.3218.
Figure 38:
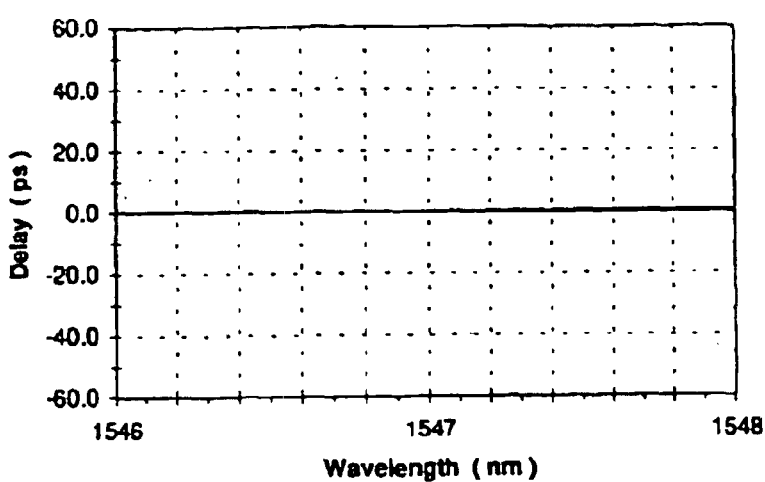
FIG. 38 is a chart showing the delay vs. wavelength for one of the two sets of interleaved channels (the even channels) in an exemplary 50 GHz two-stage interleaver constructed according to FIG. 31 or FIG. 34 and using the three-coupler unbalanced MZI assembly of FIG. 4, wherein the optical signals enter the interleaver as shown in FIG. 31 or FIG. 34 and wherein for stage 1 $k_1$ equals 0.7854, $k_2$ equals 2.0944, and $k_3$ equals 0.3218 and for stage 2 $k_1$ equals 0.7854, $k_2$ equals 2.0944, and $k_3$ equals 0.3218.
Figure 39:
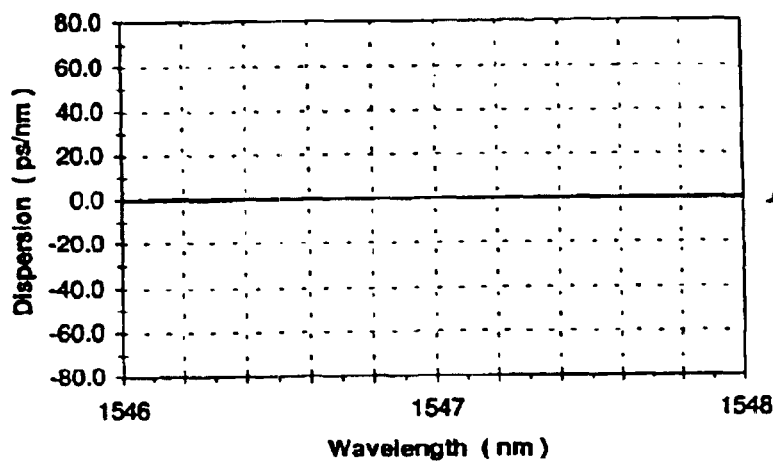
FIG. 39 is a chart showing the dispersion vs. wavelength for one of the two sets of interleaved channels (the even channels) in an exemplary 50 GHz two-stage interleaver constructed according to FIG. 31 or FIG. 34 and using the three-coupler unbalanced MZI assembly of FIG. 4, wherein the optical signals enter the interleaver as shown in FIG. 31 and FIG. 34 and wherein for stage 1 $k_1$ equals 0.7854, $k_2$ equals 2.0944, and $k_3$ equals 0.3218 and for stage 2 $k_1$ equals 0.7854, $k_2$ equals 2.0944, and $k_3$ equals 0.3218.
Figure 40:
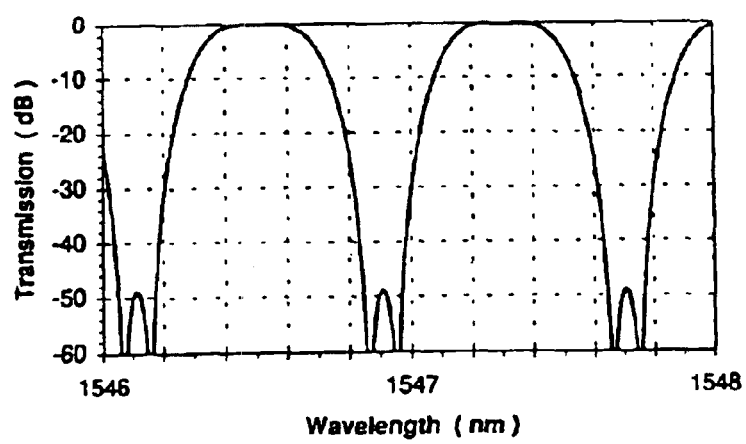
FIG. 40 is a chart showing the transmission vs. wavelength for one of the two sets of interleaved channels (the even channels) in an exemplary 50 GHz two-stage interleaver constructed according to FIG. 31 or FIG. 34 and using the three-coupler unbalanced MZI assembly of FIG. 4, wherein the optical signals enter the interleaver as shown in FIG. 31 and FIG. 34 and wherein for stage 1 $k_1$ equals 0.7854, $k_2$ equals 2.0944, and $k_3$ equals 0.3218 and for stage 2 $k_1$ equals 0.7854, $k_2$ equals 2.0944, and $k_3$ equals 0.3218.
Figure 41:
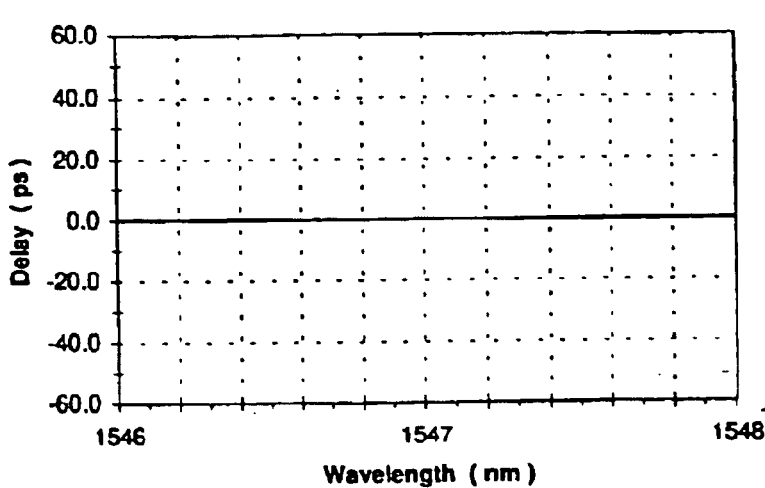
FIG. 41 is a chart showing the delay vs. wavelength for one of the two sets of interleaved channels (the odd channels) in an exemplary 50 GHz two-stage interleaver constructed according to FIG. 31 or FIG. 34 and using the four-coupler unbalanced MZI assembly of FIG. 22, wherein the optical signals enter the interleaver as shown in FIG. 31 and FIG. 34 and wherein for stage 1 $k_1$ equals 0.7854, $k_2$ equals 1.1071, $k_3$ equals 2.6779, and $k_4$ equals 0.1419 and for stage 2 $k_1$ equals 0.7854, $k_2$ equals 1.1071, $k_3$ equals 2.6779, and $k_4$ equals 0.1419.
Figure 42:
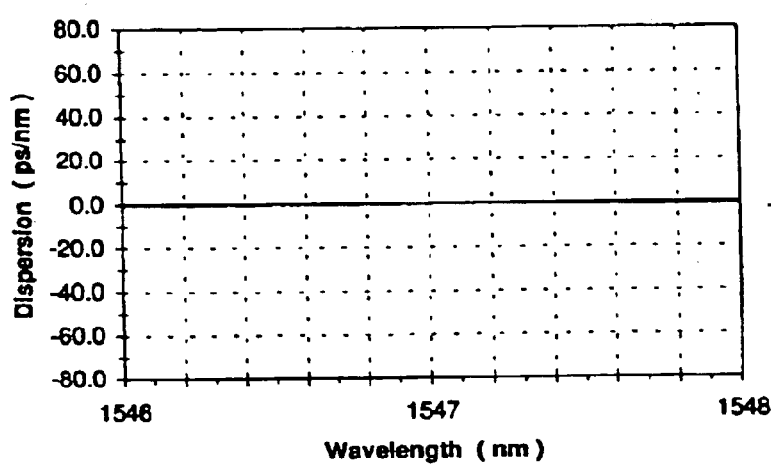
FIG. 42 is a chart showing the dispersion vs. wavelength for one of the two sets of interleaved channels (the odd channels) in an exemplary 50 GHz two-stage interleaver constructed according to FIG. 31 or FIG. 34 and using the four-coupler unbalanced MZI assembly of FIG. 22, wherein the optical signals enter the interleaver as shown in FIG. 31 and FIG. 34 and wherein for stage 1 $k_1$ equals 0.7854, $k_2$ equals 1.1071, $k_3$ equals 2.6779, and $k_4$ equals 0.1419 and for stage 2 $k_1$ equals 0.7854, $k_2$ equals 1.1071, $k_3$ equals 2.6779, and $k_4$ equals 0.1419.
Figure 43:
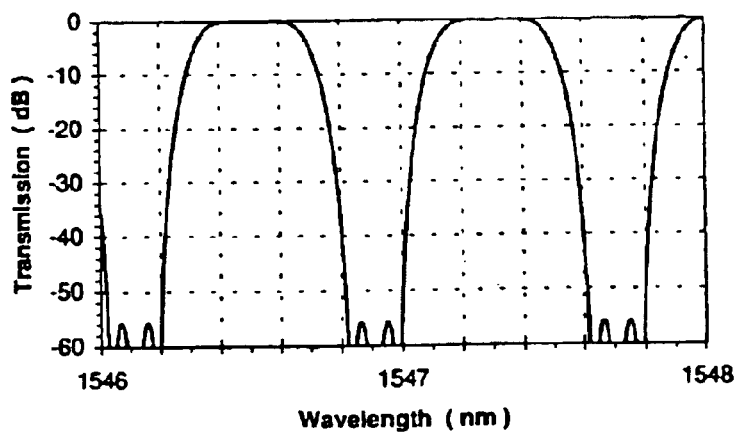
FIG. 43 is a chart showing the transmission vs. wavelength for one of the two sets of interleaved channels (the odd channels) in an exemplary 50 GHz two-stage interleaver constructed according to FIG. 31 or FIG. 34 and using the four-coupler unbalanced MZI assembly of FIG. 22, wherein the optical signals enter the interleaver as shown in FIG. 31 and FIG. 34 and wherein for stage 1 $k_1$ equals 0.7854, $k_2$ equals 1.1071, $k_3$ equals 2.6779, and $k_4$ equals 0.1419 and for stage 2 $k_1$ equals 0.7854, $k_2$ equals 1.1071, $k_3$ equals 2.6779, and $k_4$ equals 0.1419.
Figure 44:
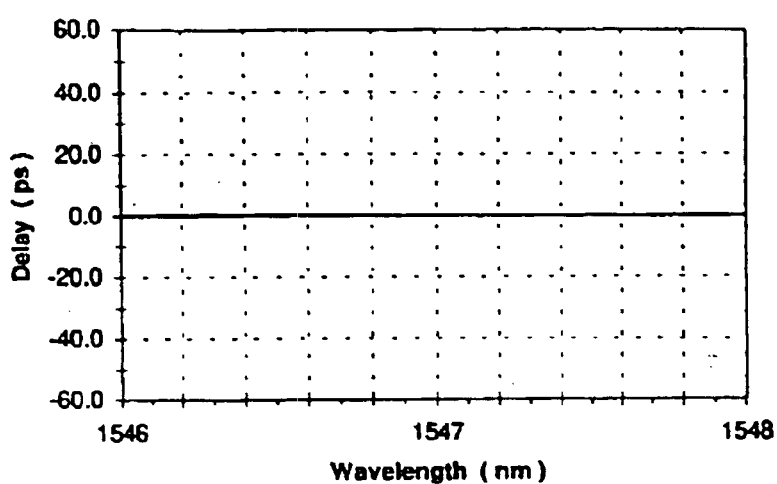
FIG. 44 is a chart showing the delay vs. wavelength for one of the two sets of interleaved channels (the even channels) in an exemplary 50 GHz two-stage interleaver constructed using the four-coupler unbalanced MZI assembly of FIG. 22, wherein the optical signals enter the interleaver as shown in FIG. 31 and FIG. 34 and wherein for stage 1 $k_1$ equals 0.7854, $k_2$ equals 1.1071, $k_3$ equals 2.6779, and $k_4$ equals 0.1419 and for stage 2 $k_1$ equals 0.7854, $k_2$ equals 1.1071, $k_3$ equals 2.6779, and $k_4$ equals 0.1419.
Figure 45:
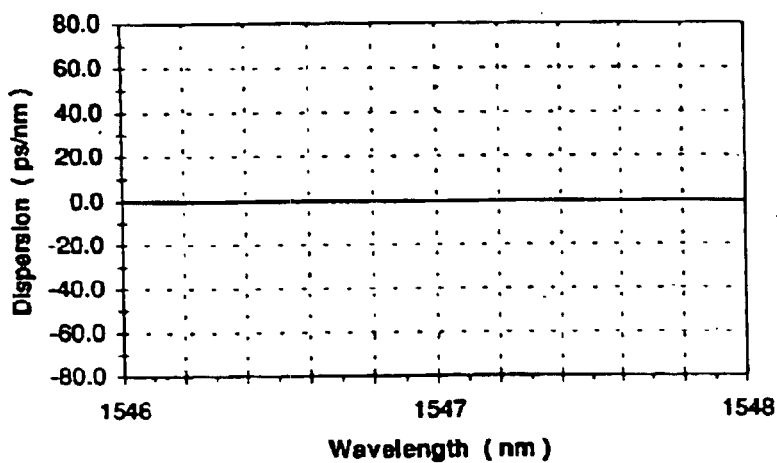
FIG. 45 is a chart showing the dispersion vs. wavelength for one of the two sets of interleaved channels (the even channels) in an exemplary 50 GHz two-stage interleaver constructed according to FIG. 31 or FIG. 34 and using the four-coupler unbalanced MZI assembly of FIG. 22, wherein the optical signals enter the interleaver as shown in FIG. 31 and FIG. 34 and wherein for stage 1 $k_1$ equals 0.7854, $k_2$ equals 1.1071, $k_3$ equals 2.6779, and $k_4$ equals 0.1419 and for stage 2 $k_1$ equals 0.7854, $k_2$ equals 1.1071, $k_3$ equals 2.6779, and $k_4$ equals 0.1419.
Figure 46:
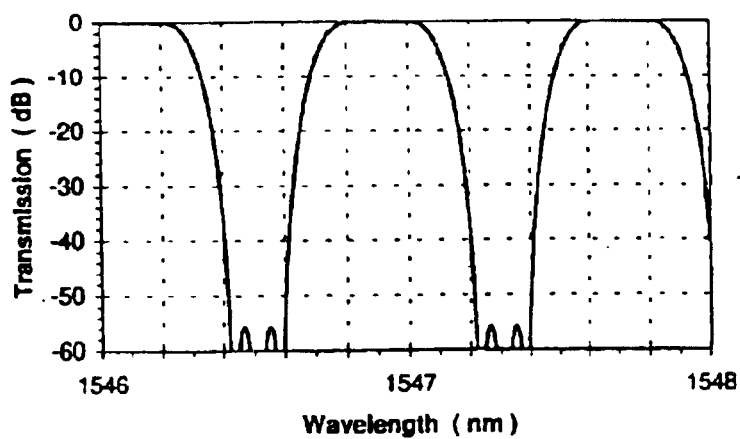
FIG. 46 is a chart showing the transmission vs. wavelength for one of the two sets of interleaved channels (the even channels) in an exemplary 50 GHz two-stage interleaver constructed according to FIG. 31 or FIG. 34 and using the four-coupler unbalanced MZI assembly of FIG. 22, wherein the optical signals enter the interleaver as shown in FIG. 31 and FIG. 34 and wherein for stage 1 $k_1$ equals 0.7854, $k_2$ equals 1.1071, $k_3$ equals 2.6779, and $k_4$ equals 0.1419 and for stage 2 $k_1$ equals 0.7854, $k_2$ equals 1.1071, $k_3$ equals 2.6779, and $k_4$ equals 0.1419.
Figure 47:
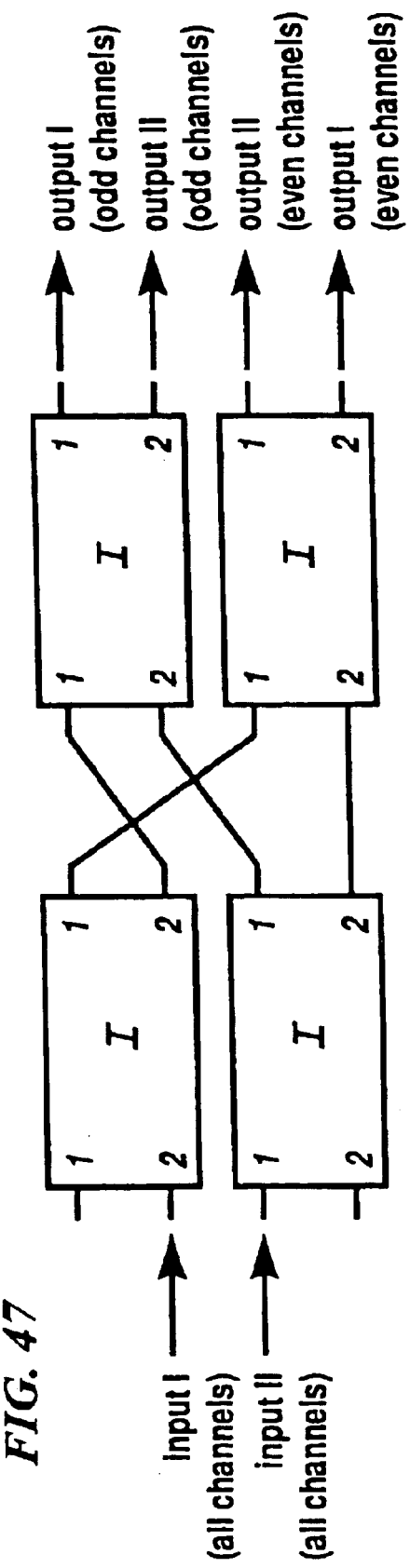
Figure 48:
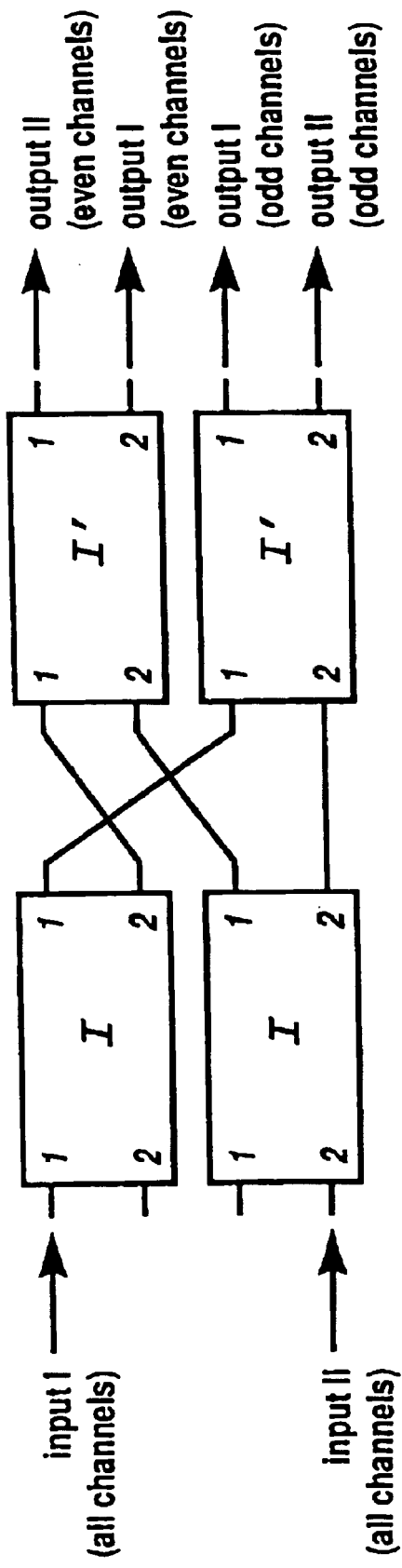
Figure 51:
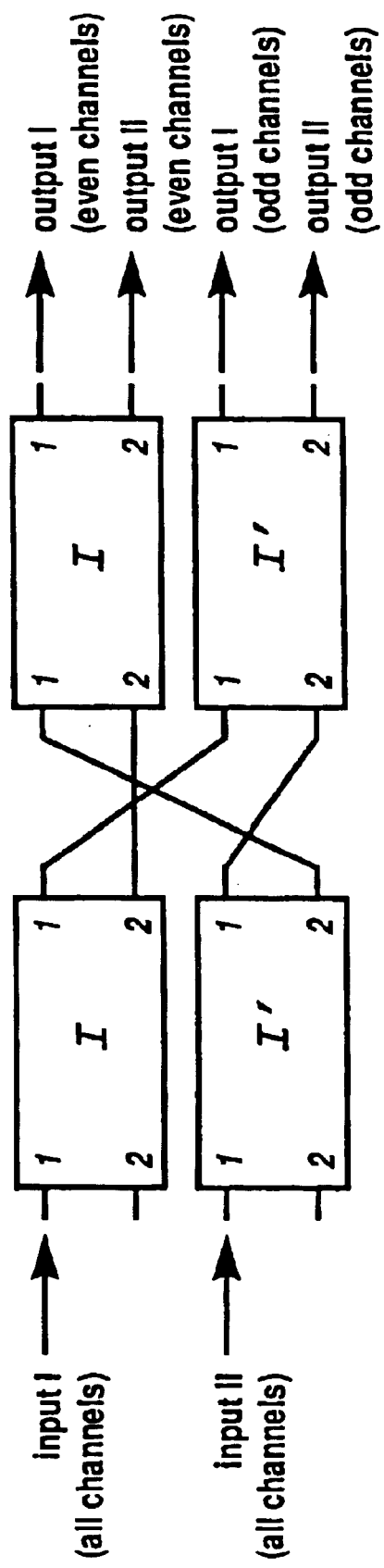
Figure 52:
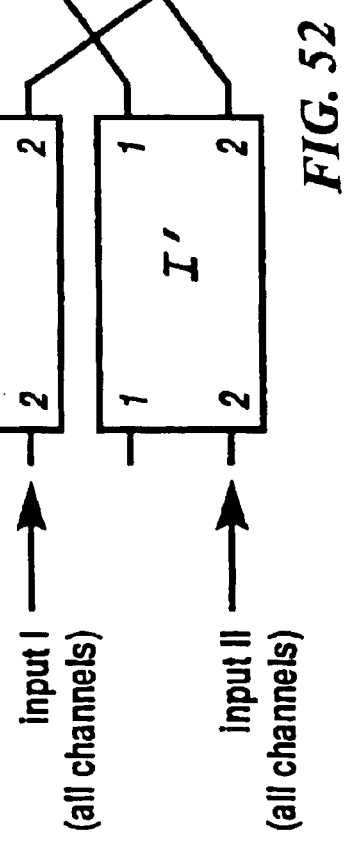
Figure 53:
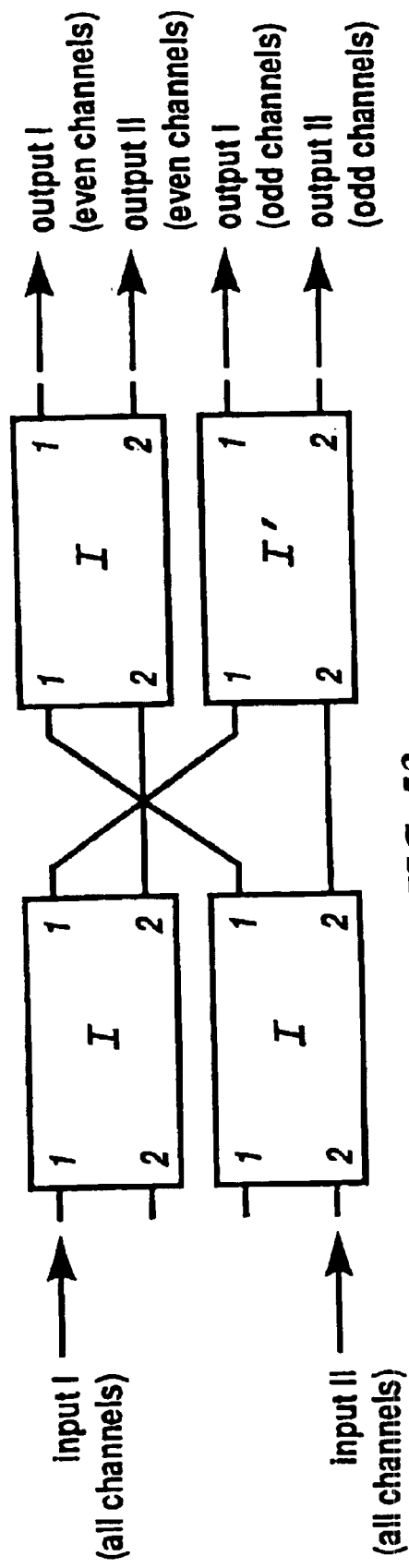

The configurations shown in FIGS. 31 or 34 make the optical signals experience dispersion with opposite sign when they pass though the interleaver element in stage 1 and the interleaver elements in stage 2. Thus, zero (or nearly zero) dispersion is obtained for each channel as shown in FIGS. 35–37 and in FIGS. 38–40.

Figure 32:
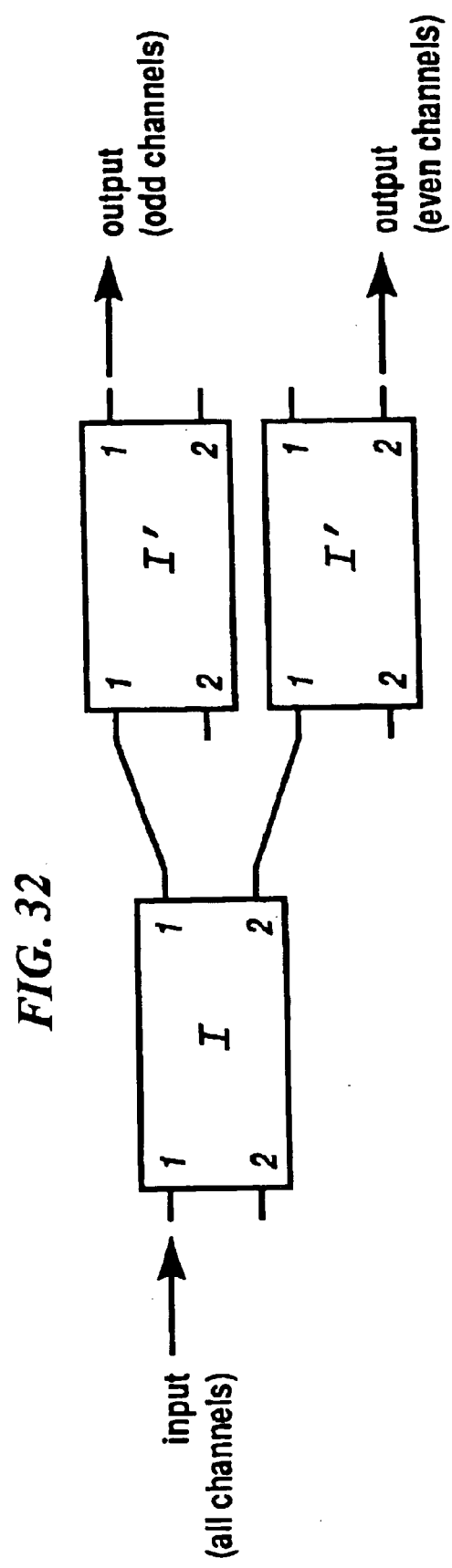
FIG. 32 is a block diagram showing three unbalanced MZI assemblies configured to form an interleaver, wherein an input is provided to the first input port of the first unbalanced MZI assembly, the first output of the first unbalanced MZI assembly is provided to the first input port of the second unbalanced MZI assembly and the second output from the first unbalanced MZI assembly is provided to the first input port of the third unbalanced MZI assembly.
Figure 33:
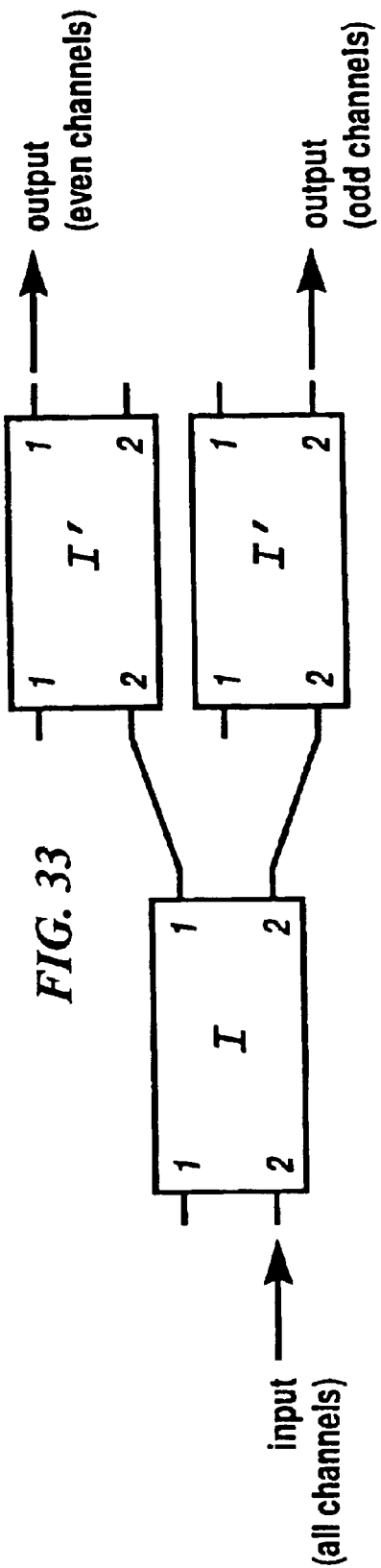
FIG. 33 is a block diagram showing three unbalanced MZI assemblies configured to form an interleaver, wherein an input is provided to the second input port of the first unbalanced MZI assembly, the first output of the first unbalanced MZI assembly is provided to the second input port of the second unbalanced MZI assembly and the second output from the first unbalanced MZI assembly is provided to the second input port of the third unbalanced MZI assembly.

In accordance with another embodiment of present invention, a first interleaver element (I) in stage 1 and two secondary interleaver elements (I') in stage 2, which are complementary to the first interleaver element in stage 1, are connected as shown in FIG. 32 or FIG. 33 to construct a two-stage interleaver. Here, we define that two interleavers are complementary with each other if for the same channelization, the corresponding channels (with the same transmission characteristics) in the two interleavers have flipped dispersion (or substantially flipped dispersion).

In the following, we show an example to construct a complementary interleaver element. If an interleaver I has N phase delay elements and the coupling coefficients are designated as:

$$\{k_m\}=k_1, k_2, \ldots, k_N, k_{N+1} \quad (4)$$

a complementary interleaver I' can have the same N phase delay elements and the corresponding coupling coefficients are:

$$\{k_m'\} = \frac{n_1}{2}\pi \pm k_1, \frac{n_2}{2}\pi \pm k_2, \ldots, \frac{n_N}{2}\pi \pm k_N, \frac{n_{N+1}}{2}\pi \pm k_{N+1} \quad (5)$$

where $n_m=0, \pm1, \pm2, \ldots$ and $m=1, 2, \ldots N, N+1$. As we will discuss later, only a some sets of $n_m$ values can be used for the complementary interleaver element. We will discuss the requirement for $n_m$ selection for complementary interleaver elements later. As an example, one can select the $n_m$ so that the resultant coupling coefficients lead to the matrix elements for complementary interleavers shown in FIG. 54. Although FIG. 54 only shows the results for the interleavers of two or three phase delay elements, similar results can be obtained for the interleavers of more than three phase delay elements.

Figure 19:
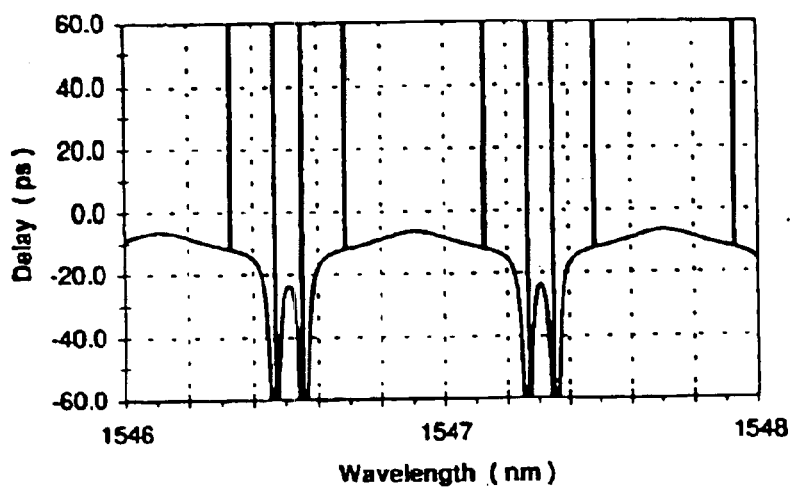
FIG. 19 is a chart showing the delay vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 1.0472 and $k_3$ equals 1.2490.
Figure 20:
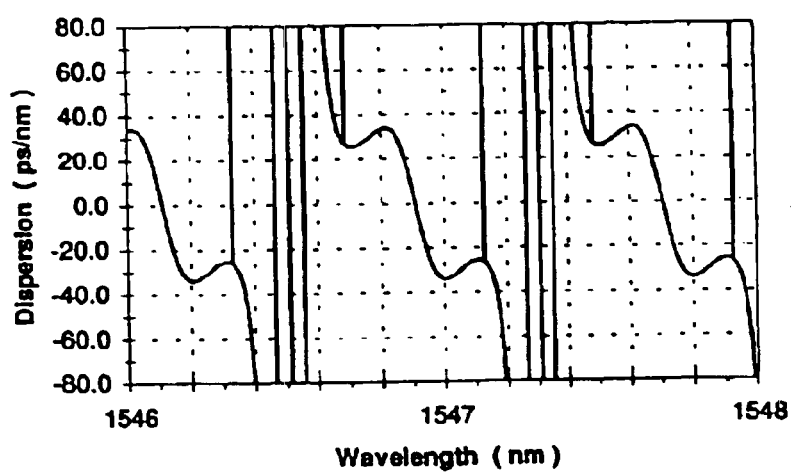
FIG. 20 is a chart showing the dispersion vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 1.0472, and $k_3$ equals 0.12490.
Figure 21:
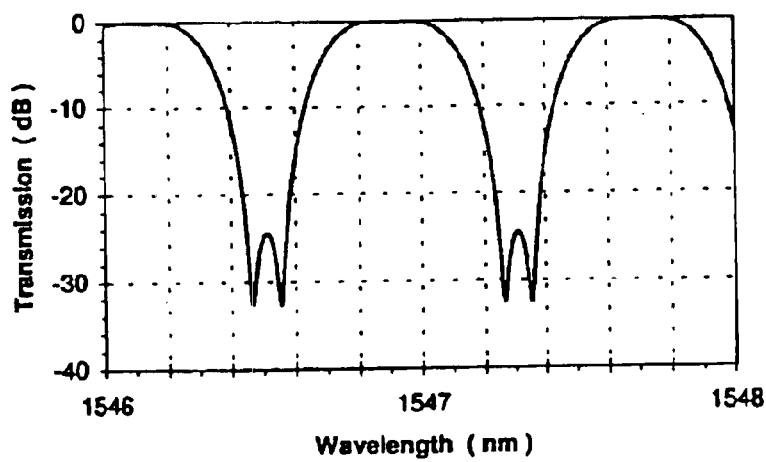
FIG. 21 is a chart showing the transmission vs. wavelength for one of the two sets of interleaved channels (the odd channels) in an exemplary 50 GHz interleaver constructed using the three-coupler unbalanced MZI assembly of FIG. 4, wherein the optical signals enter the interleaver at input port 1 as shown in FIG. 5 and wherein $k_1$ equals 0.7854, $k_2$ equals 1.0472, and $k_3$ equals 1.2490.

FIGS. 19–21 show the time delay, dispersion and transmission as a function of wavelength for one of the two sets of interleaver channels (e.g., the odd channels) for an exemplary 50 GHz interleaver constructed using the three-coupler MZI assembly as shown in FIG. 4 ($D_1=\Gamma$, $D_2=2\Gamma$), which is complementary to the interleaver element whose characteristics are shown in FIGS. 7–9, when the optical signals enter the interleaver from input port 1 as shown in FIG. 5. The corresponding values for the coupling coefficients for the interleaver are shown on FIGS. 19–21. FIGS. 19–21 show that the dispersion in the complementary element has an opposite value in comparison to the original interleaver element (FIGS. 7–9) for each corresponding odd channel. That is, the dispersion vs. wavelength curve of FIG. 20 is flipped with respect to the dispersion vs. wavelength curve of FIG. 8, such that when a device producing the dispersion vs. wavelength curve of FIG. 8 cooperates with a device which provides dispersion vs. wavelength curve of FIG. 20, then zero or approximately zero dispersion can be obtained. The same is true for the even channels.

Each interleaver element (I and I') can have two phase delay elements shown in FIG. 4 or three or more phase delay elements. The corresponding ports for input, output for odd channels and even channels are exemplarily shown on FIGS. 32 and 33. The first stage of the interleaver contains one interleaver element (I) which separates the odd channels and the even channels. The second stage contains two complementary interleaver elements(I'), one for the odd channels and other for the even channels for dispersion compensation. The configurations shown in FIGS. 32 and 33 make the optical signals experience dispersion with opposite sign when they pass through the interleaver element in stage 1 and the interleaver elements in stage 2. Thus, zero or nearly zero dispersion can be obtained. For an exemplary 50 GHz interleaver with configurations shown in FIGS. 32 and 33, where the interleaver elements contain unbalanced MZI assembly of two delay elements, figures for the time delay, dispersion and transmission as a function of wavelength for the odd channels and the even channels are almost the same to that shown in FIGS. 35–37 and FIGS. 38–40 with only one exception: the time delay is a non-zero constant.

Figure 22:
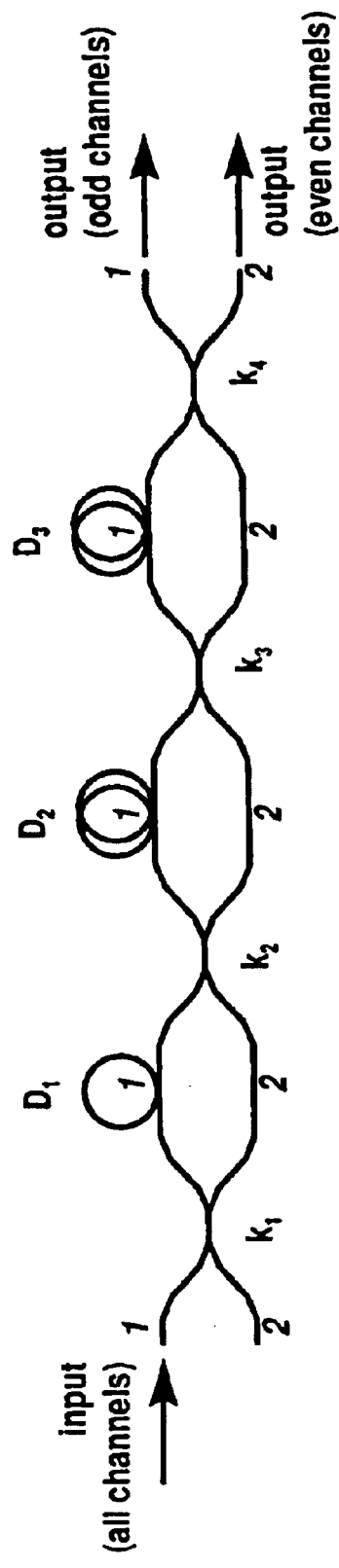
FIG. 22 is a schematic diagram of an unbalanced MZI assembly having four couplers which may be used to construct an interleaver.

Although the above description uses interleaver elements constructed using MZI assembly of two phase delay elements as shown in FIG. 4 as example, this invention is applicable to interleavers of three or more phase delay elements. In FIG. 22, an interleaver element constructed using MZI assembly of three phase delay elements is shown. The outputs optical fields and the input optical fields are related by an equation similar to Eq. (3) with more corresponding transfer matrix in the equation. From this equation, various interleaver properties can be obtained.

Figure 24:
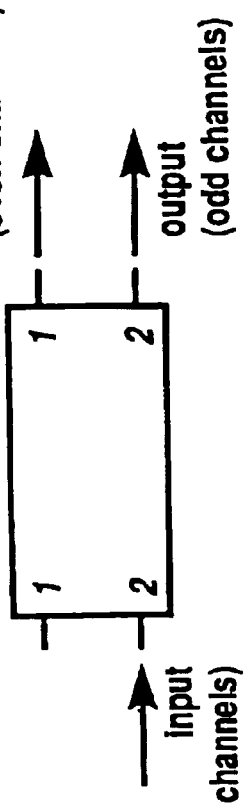
FIG. 24 is a block diagram of an unbalanced MZI assembly according to FIG. 22 showing the distribution of output channels for an input at the second port thereof.
Figure 23:
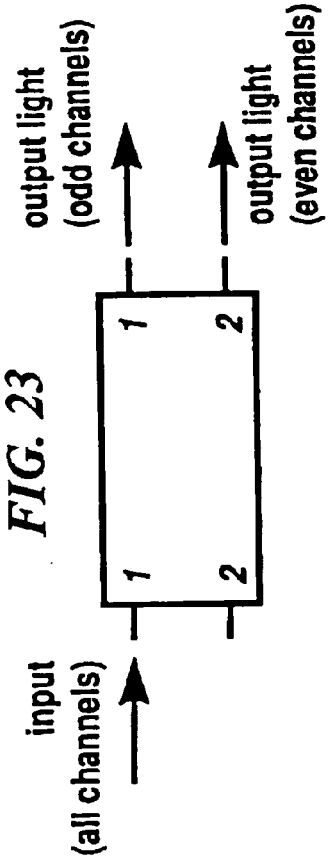
FIG. 23 is a block diagram of an unbalanced MZI assembly according to FIG. 22 showing the distribution of output channels for an input at the first port thereof.

Referring now to FIGS. 23 and 24, an example of channelization for input signals being provided on a given input port is shown. More particularly, as shown in FIG. 23, when input signals are provided to input port 1, the odd channels are output on output port 1 and the even channels are output on output port 2. As shown in FIG. 24, when input signals are provided on input port 2, the even channels are output on output port 1 and the odd channels are output on output port 2. As discussed above, it is possible to define the channelization for an interleaver of an MZI assembly such that the output port for odd channels and the output port for even channels of FIGS. 23 and 24 are reversed.

Figure 25:
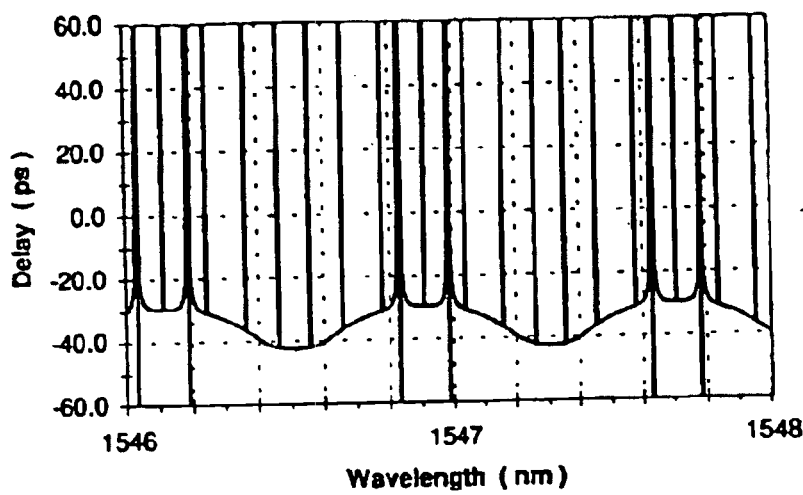
FIG. 25 is a chart showing the delay vs. wavelength for one of the two sets of interleaved (the even channels) in an exemplary 50 GHz interleaver constructed using the four-coupler unbalanced MZI assembly of FIG. 22, wherein the optical signals enter the interleaver at input port 1 as shown in FIG. 23 and wherein $k_1$ equals 0.7854, $k_2$ equals 1.1071, $k_3$ equals 2.6779, and $k_4$ equals 0.1419.
Figure 26:
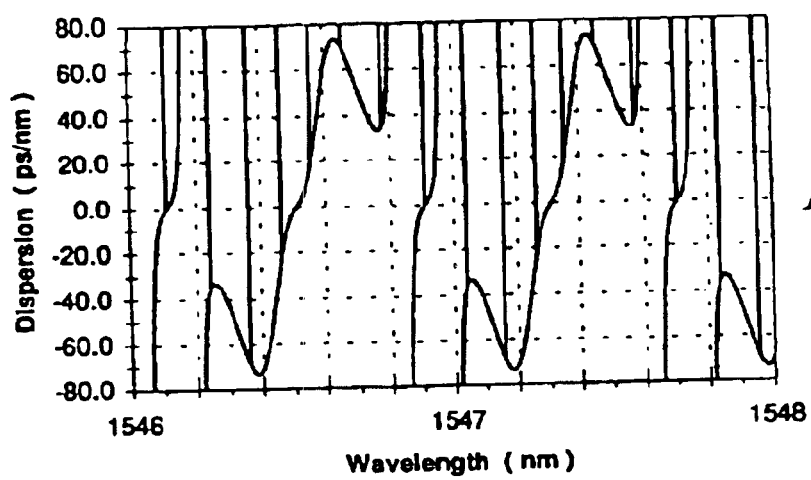
FIG. 26 is a chart showing the dispersion vs. wavelength for one of the two sets of interleaved channels (the even channels) in an exemplary 50 GHz interleaver constructed using the four-coupler unbalanced MZI assembly of FIG. 22, wherein the optical signals enter the interleaver at input port 1 as shown in FIG. 23 and wherein $k_1$ equals 0.7854, $k_2$ equals 1.1071, $k_3$ equals 2.6779, and $k_4$ equals 0.1419.
Figure 27:
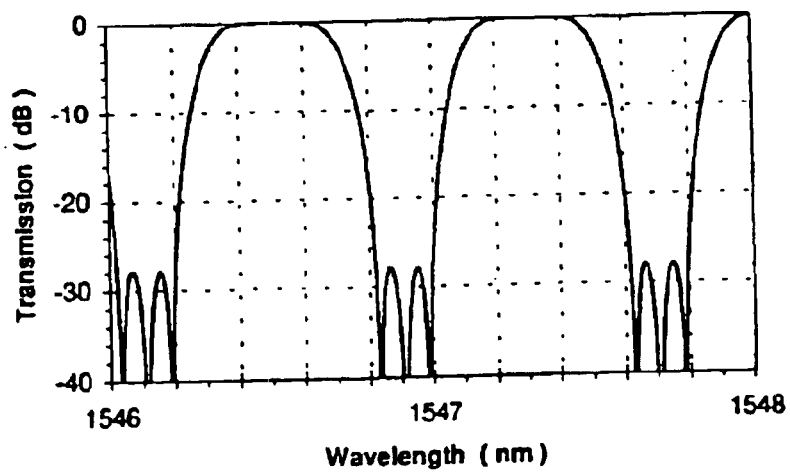
FIG. 27 is a chart showing the transmission vs. wavelength for one of the two sets of interleaved channels (the even channels) in an exemplary 50 GHz interleaver constructed using the four-coupler unbalanced MZI assembly of FIG. 22, wherein the optical signals enter the interleaver at input port 1 as shown in FIG. 23 and wherein $k_1$ equals 0.7854, $k_2$ equals 1.1071, $k_3$ equals 2.6779, and $k_4$ equals 0.1419.
Figure 28:
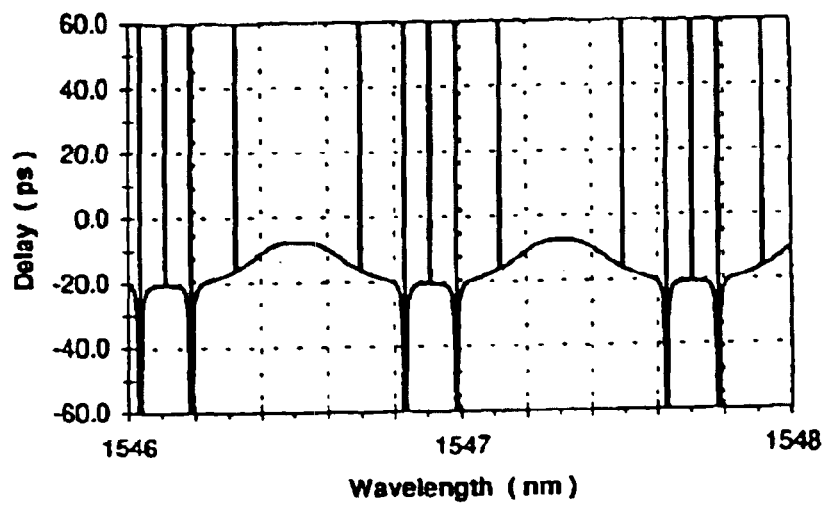
FIG. 28 is a chart showing the delay vs. wavelength for one of the two sets of interleaved channels (the even channels) in an exemplary 50 GHz interleaver constructed using the four-coupler unbalanced MZI assembly of FIG. 22, wherein the optical signals enter the interleaver at input port 1 as shown in FIG. 23 and wherein $k_1$ equals 0.7854, $k_2$ equals 2.0344, $k_3$ equals 0.4636, and $k_4$ equals 1.4289.
Figure 29:
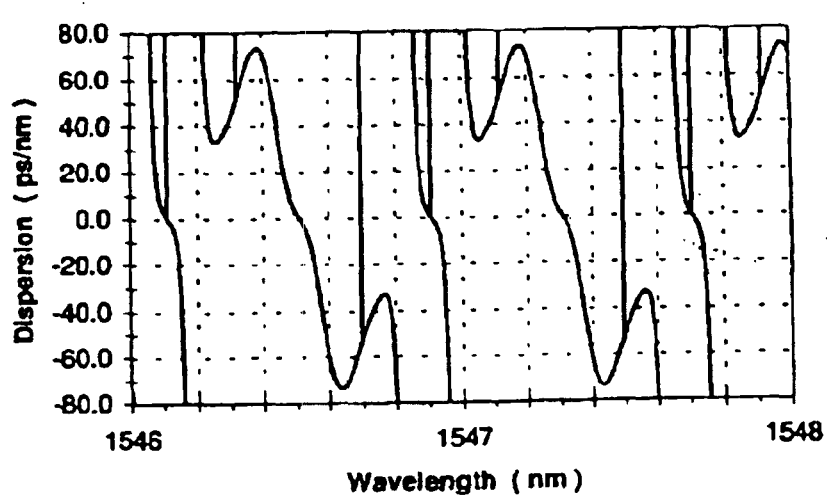
FIG. 29 is a chart showing the dispersion vs. wavelength for one of the two sets of interleaved channels (the even channels) in an exemplary 50 GHz interleaver constructed using the four-coupler unbalanced MZI assembly of FIG. 22, wherein the optical signals enter the interleaver at input port 1 as shown in FIG. 23 and wherein $k_1$ equals 0.7854, $k_2$ equals 2.0344, $k_3$ equals 0.4636, and $k_4$ equals 1.4289.
Figure 30:
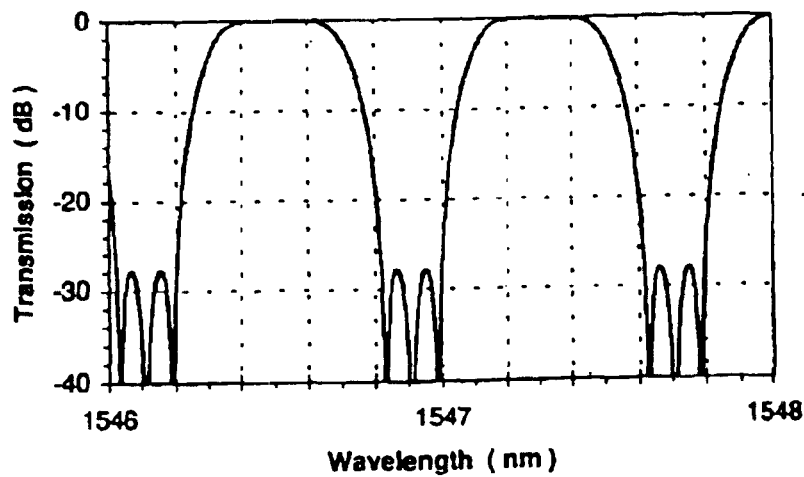
FIG. 30 is a chart showing the transmission vs. wavelength for one of the two sets of interleaved channels (the even channels) in an exemplary 50 GHz interleaver constructed using the four-coupler unbalanced MZI assembly of FIG. 22, wherein the optical signals enter the interleaver at input port 1 as shown in FIG. 23 and wherein $k_1$ equals 0.7854, $k_2$ equals 2.0344, $k_3$ equals 0.4636, and $k_4$ equals 1.4289.

FIGS. 25–27 show the time delay, dispersion and transmission as a function of wavelength for one of the two sets of interleaved channels (e.g., the even channels) in a 50 GHz interleaver element of three phase delay elements when the optical signals enter the interleaver from port 1 as shown in FIG. 23. The values for the coupling coefficients $k_1$, $k_2$, $k_3$, $k_4$ are shown on FIGS. 25–27, $D_1=\Gamma$, $D_2=2\Gamma$, $D_3=2\Gamma$ and the F value determines the channel wavelength of the interleaver. As shown by the transmission curve in FIG. 27, improved passband and stopband characteristics can be obtained (in comparison to FIG. 12). Similarly, for the interleaver elements of three phase delay elements, configurations shown in FIGS. 31 and 34 lead to zero or nearly zero dispersion for the interleaved odd and even channels. For an exemplary 50 GHz interleaver with configurations shown in FIGS. 31 and 34, where each interleaver element contains three phase delay elements, the time delay, dispersion and transmission as a function of wavelength for the odd channels and the even channels are shown in FIGS. 41–43 and FIGS. 44–46, respectively. FIGS. 28–30 shows the time delay, dispersion and transmission as a function of wavelength for one of the two sets of interleaved channels (e.g., the even channels) in a 50 GHz interleaver element, which is complementary to the interleaver element whose characteristics are shown in FIGS. 25–27, when the optical signals enter the interleaver from port 1 as shown in FIG. 23.

As shown in FIGS. 32 and 33, complementary interleavers (as opposed to equivalent interleavers shown in FIGS. 31 and 34) are configured so as to cooperate with one another and thereby provide zero dispersion or approximately zero dispersion. Such complementary interleavers are interleavers which have flipped dispersion vs. wavelength curves with respect to one another for each corresponding channel under the same channelization.

Referring now to FIG. 32, when an input is provided to port 1 of the first interleaver element and the outputs of the first interleaver element are each provided to port 1 of the complementary interleaver elements, then zero or approximately zero dispersion is obtained for the interleaver assembly.

Referring now to FIG. 33, when an input is provided to port 2 of the first interleaver element and the outputs of the first interleaver element are each provided to port 2 of the complementary interleaver elements, then zero or approximately zero dispersion is again obtained.

In above description, the interleaver of zero or extremely low dispersion is constructed by using three interleaver elements. In FIGS. 47–53, we show how to construct two interleavers of zero or extremely low dispersion by using only four interleaver elements, where the interleaver element I' is complementary to the interleaver element 1. That is, each of the assemblies of FIGS. 47–53 is a dual input interleaver (it accepts and independently interleaves two separate signals, wherein each signal comprises substantially the same frequency range and it provides two odd channel outputs and two even channel outputs).

In essence, the dual input interleavers of FIGS. 47–53 perform the function of two separate low dispersion interleavers. However, instead of requiring six unbalanced MZI assemblies (as would be required to construct two separate interleaves, such as those of FIGS. 31–34), the dual input interleavers of FIGS. 47–53 require only four separate MZI assemblies in the construction thereof, due to their efficient use of the MZI assemblies).

In FIGS. 31–34 and 47–53, we used two kinds (I and I') of interleaver elements which are complementary with each other. Within each kind of interleaver elements, the interleaver elements do not need to be the same. They just need to be equivalent with each other in the sense that they have identical (or similar) transmission and dispersion behavior. For example, by keeping the phase delay elements the same, the coupling coefficients can be changed from Eq. (4) to Eq. (5) for the equivalent interleaver elements. One requirement for selection of $n_m$ for the equivalent element will be that they result in identical (or similar) transmission and dispersion behavior. As an example of satisfying this requirement, one can select the $n_m$ so that the resultant coupling coefficients lead to the matrix elements for equivalent interleavers shown in FIG. 55. Although FIG. 55 only shows the results for the interleavers of two or three phase delay elements, similar results can be obtained for the interleavers of more than three phase delay elements. Going back to the discussion on requirement for selection of $n_m$ for complementary interleavers, the selected $n_m$ values should result in identical (or similar) transmission behavior and flipped dispersion behavior for the complementary elements. FIG. 54 and FIG. 55 just show examples satisfying the corresponding requirements for complementary and equivalent interleaver elements. It is straightforward to figure out other possibilities for complementary interleaver elements and equivalent interleaver elements. In addition, the phase delay elements can change their positions to the other path of the MZI assembly and thus change the sign of phase delay in conjunction with corresponding change in the coupling coefficients.

In FIGS. 31–34 and 47–53, I is referred to the equivalent interleavers with identical (or similar) transmission and dispersion behavior while the phase delay and coupling coefficients can be different. The same applies for I'. For complementary interleavers, the complementary is referred to that interleavers I' have the same (or similar) transmission behavior and flipped dispersion behavior in comparison to interleavers I no matter how the phase delay and coupling coefficients are selected.

In the equivalent interleaver configurations of FIGS. 31 and 34, both of the second stage MZI assemblies receive their inputs on input ports which are opposite the input port of the first stage MZI assembly. That is, if the first stage MZI assembly receives an input on input port 1, then both of the second stage MZI assemblies receive an input on input port 2 and vice versa.

By way of contrast, the complementary interleaver configurations shown in FIGS. 32 and 33, the two second stage MZI assemblies receive their inputs on the same input port as the input port of the first stage MZI assembly which receives an input. That is, when the first stage MZI assembly receives an input on input port 1, then both of the second stage MZI assemblies receive their inputs on input port 1 and when the first stage MZI assembly receives its input on input port 2, then both of the second stage MZI assemblies receives their inputs on input port 2.

Similarly, input and output ports of a given MZI assembly may be referred to as the same or opposite. That is, output port 1 is the same as input port 1 and output port 2 is the opposite of input port 1.

FIGS. 31–34 are only exemplary configurations which show the spirit of this invention. Other configurations are likewise possible. For example, by removing one interleaver element in stage 1 of FIGS. 47–53, new configurations can be found for the zero or nearly zero dispersion interleavers.

In the following, we give some specific examples on how to construct a complementary interleaver and an equivalent interleaver. If an interleaver I has N phase delay elements and the coupling coefficients are designated as shown in Eq. (4), a complementary interleaver I' can be designed such that it has the same N phase delay elements and the corresponding coupling coefficients can be chosen as:

$$\{k_m\} = \frac{\pi}{2} - k_1, \pi - k_2, \ldots, \pi - k_N, \frac{\pi}{2} - k_{N+1} \quad (6)$$

If one (or more) $k_m$ (m=1, 2, ... N, N+1) in Eq. (6) is (are) less than zero, we can just add $2n\pi$ (n=1, 2, ...) to that (or those) km to make it (them) positive. The coupling coefficient is typically related to coupling length which is typically positive. Another set of coupling coefficients for the complementary interleaver can be chosen as:

$$\{k_m\} = \frac{\pi}{2} + k_1, \pi + k_2, \ldots, \pi + k_N, \frac{\pi}{2} + k_{N+1} \quad (7)$$

For the equivalent interleaver I, it can be designed such that it has the same N phase delay elements and the corresponding coupling coefficients can be chosen as:

$$\{k_m\} = \pi - k_1, 2\pi - k_2, \ldots, 2\pi - k_N, \pi - k_{N+1} \quad (8)$$

or $$\{k_m\} = \pi + k_1 k_2, \ldots k_N \pi + k_{N+1} \quad (9)$$

Similarly, if one (or more) $k_m$ (m=1, 2, ... N, N+1) in Eq. (8) is (are) less than zero, we can just add $2n\pi$ (n=1, 2, ...) to that (or those) km to make it (them) positive.

In above discussion, the selected values for $D_1, D_2, \ldots D_{n-1} D_n$ are 1, 2, ..., 2, 2 times Γ for desired passband and stopband features. Instead of 1, 2, ..., 2, 2 other integer sets (e.g., 1, -2, ..., 2, 2; 1, -2, ..., -2, -2; 1, 2, ..., 2, 1; etc.) are possible for flat passband and stopband. The order of the phase delay elements can be changed. The above selected values for the coupling coefficients $k_1, k_2, \ldots k_N$, $k_{N+1}$ are exemplary and other optimized values are possible for desired flat passband and stopband characteristics. With consideration of the non-ideal situations that the phase delay and coupling coefficients may depend on the optical wavelength, the selected values for $_1, D_2 \ldots D_{n1}, D_n$ and $k_1, k_2, \ldots k_n, k_{n+1}$ may somehow deviate from the nominal values given above for optimized interleaver performance. However, the two dispersion compensation methods and corresponding apparatus disclosed in this invention are applicable to any values of $D_1, D_2, \ldots D_{n-1}, D_n$, and $k_1, k_2, \ldots k_N, k_{N+1}$.

Tables I–VIII below provide guidelines for constructing a zero dispersion interleaver assembly according to the present invention. According to the present invention, various different combinations of a first interleaver element and a second interleaver element can be used so as to provide an interleaver assembly having zero or approximately zero dispersion. It is possible to construct an interleaver assembly according to the present invention utilizing equivalent interleaver elements (wherein the interleaver elements have substantially the same transmission vs. wavelength curves and have substantially the same dispersion vs. wavelength curves). And it is also possible to construct an interleaver assembly having zero dispersion or approximately zero dispersion utilizing complementary interleaver elements (wherein the interleaver elements have substantially the same transmission vs. wavelength curves and have dispersion vs. wavelength curves which are flipped with respect to one another). Tables I–VIII below summarize at least some of the possible configurations of phase delays and coupling coefficients for interleaver elements which may be selected as matched pairs (for interleaving only odd channels or for interleaving only even channels), as matched triplets (such as exemplarily shown in FIGS. 31–34) and as matched quads (such as exemplarily shown in FIGS. 47–53). The first line in each table provides a mathematical description of the phase delays for the interleaver elements of that table and the second line provides a mathematical description of the coupling coefficients for the interleaver elements of that table. For the ± signs used in the tables before the coupling coefficients, the sign will be either + for all coupling coefficients or − for all coupling coefficients. Each table then provides the output channelization (odd channels or even channels) and corresponding dispersion characteristics, wherein in the column for dispersion characteristics, sign + is referred to a not flipped dispersion curve and sign− is referred to a flipped dispersion curve for the corresponding channels in each configuration of channelization.

In order to construct a zero or approximately zero dispersion filter or interleaver assembly, first select a first stage MZI assembly having any of the configurations listed in the tables. That is, two lines with the same input ports from one table are selected. The phase delays and coupling coefficients will be defined by the table which is selected (the phase delays and coupling coefficients are characterized mathematically in the first 2 lines of each table).

The two outputs for a given input port are provided for each table. Thus, for example, if Table I is utilized and the input is provided on port 1 of the first stage MZI assembly, then output 1 is odd channels with + dispersion characteristics and output 2 is even channels with − dispersion characteristics.

A second stage MZI assembly configuration is next selected from the tables so as to provide the desired channelization (odd channels or even channels) and so as to have dispersion with a sign opposite to that of the first stage for each corresponding channel. Therefore, the selected second stage MZI assembly and its channelization provide a dispersion vs. wavelength curve which is flipped with respect to that of the first stage for each corresponding channel.

Thus, if the first stage was selected from Table I and has an input at port 1 and a second stage is desired so as to provide zero dispersion or approximately zero dispersion for the odd channels, then a second stage must be defined which has a − sign in a dispersion column for the odd channels (such that the dispersion from the second stage will be flipped with respect to the dispersion of the first stage for the odd channels).

Similarly, another MZI assembly can be selected for the second stage so as to provide interleaving of zero or approximately zero dispersion for the even channels thereof. In each instance, it is necessary that the signs of the dispersion curves for the first and second stages be different from one another.

When selecting the first stage MZI assembly configuration and the second stage MZI assembly configuration from tables I–VIII, it is not necessary that each MZI assembly have the same numeric constants ($m_1, m_2, \ldots, m_{N-1}, m_N, n_1, n_2, \ldots, n_N,$ and $n_{N+1}$). This is true not only for a filter or interleaver assembly having two MZI assemblies, but rather is also true for a filter or interleaver assembly having any other desired number of MZI assemblies. Thus, the filter or interleaver assemblies shown in FIGS. 31–34 (each of which has 3 MZI assemblies), as well as the filter or interleaver assemblies shown in FIGS. 47–53 (each of which has 4 MZI assemblies), can be constructed by selecting MZI assembly configurations from Tables I–VIII and the numerical coefficients ($m_1, m_2, \ldots, m_{N-1}, m_N, n_1, n_2, \ldots, n_{N+1},$ and $n_{N+1}$) are selected independently with respect to one another.

TABLE I

Configuration, channelization, and dispersion of an MZI assembly.

$\Gamma + 2m_1\pi, 2\Gamma + 2m_2\pi, \ldots, 2\Gamma + 2m_{N-1}\pi, 2\Gamma + 2m_N\pi$
$n_1\pi \pm k_1, 2n_2\pi \pm k_2, 2n_3\pi \pm k_3, \ldots, 2n_{N-1}\pi \pm k_{N-1}, 2n_N\pi \pm k_N,$
$n_{N+1}\pi \pm k_{N+1}$

| Input | Output | Channel | Dispersion |
|---|---|---|---|
| 1 | 1 | odd | + |
| 1 | 2 | even | − |
| 2 | 1 | even | + |
| 2 | 2 | odd | − |

Wherein $m_1, m_2, \ldots, m_{N-1}, m_N, n_1, n_2, \ldots, n_N,$ and $n_{N+1}$ are integers (0, ±1, ±2, ±3, …).

TABLE II

Configuration, channelization, and dispersion of an MZI assembly.

$2\Gamma + 2m_N\pi, 2\Gamma + 2m_{N-1}\pi, \ldots, 2\Gamma + 2m_2\pi, \Gamma + 2m_1\pi$
$n_{N+1}\pi \pm k_{N+1}, 2n_N\pi \pm k_N, 2n_{N-1}\pi \pm k_{N-1}, \ldots, 2n_3\pi \pm k_3, 2n_2\pi \pm k_2,$
$n_1\pi \pm k_1$

| Input | Output | Channel | Dispersion |
|---|---|---|---|
| 1 | 1 | odd | + |
| 1 | 2 | even | + |
| 2 | 1 | even | − |
| 2 | 2 | odd | − |

Wherein $m_1, m_2, \ldots, m_{N-1}, m_N, n_1, n_2, \ldots, n_N,$ and $n_{N+1}$ are integers (0, ±1, ±2, ±3, …).

TABLE III

Configuration, channelization, and dispersion of an MZI assembly.

$\Gamma + 2m_1\pi, 2\Gamma + 2m_2\pi, \ldots, 2\Gamma + 2m_{N-1}\pi, 2\Gamma + 2m_N\pi$
$(2n_1 + 1)\pi/2 \pm k_1, (2n_2 + 1)\pi \pm k_2, (2n_3 + 1)\pi \pm k_3, \ldots, (2n_{N-1} + 1)\pi \pm k_{N-1}, (2n_N + 1)\pi \pm k_N, (2n_{N+1} + 1)\pi/2 \pm k_{N+1}$

| Input | Output | Channel | Dispersion |
|---|---|---|---|
| 1 | 1 | odd | − |
| 1 | 2 | even | + |
| 2 | 1 | even | − |
| 2 | 2 | odd | + |

Wherein $m_1, m_2, \ldots, m_{N-1}, m_N, n_1, n_2, \ldots, n_N,$ and $n_{N+1}$ are integers (0, ±1, ±2, ±3, …).

TABLE IV

Configuration, channelization, and dispersion of an MZI assembly.

$2\Gamma + 2m_N\pi, 2\Gamma + 2m_{N-1}\pi, \ldots, 2\Gamma + 2m_2\pi, \Gamma + 2m_1\pi$
$(2n_{N+1} + 1)\pi/2 \pm k_{N+1}, (2n_N + 1)\pi \pm k_N, (2n_{N-1} + 1)\pi \pm k_{N-1}, \ldots,$
$(2n_3 + 1)\pi \pm k_3, (2n_2 + 1)\pi \pm k_2, (2n_1 + 1)\pi/2 \pm k_1$

| Input | Output | Channel | Dispersion |
|---|---|---|---|
| 1 | 1 | odd | − |
| 1 | 2 | even | − |
| 2 | 1 | even | + |
| 2 | 2 | odd | + |

Wherein $m_1, m_2, \ldots, m_{N-1}, m_N, n_1, n_2, \ldots, n_N,$ and $n_{N+1}$ are integers (0, ±1, ±2, ±3, …).

TABLE V

Configuration, channelization, and dispersion of an MZI assembly.

$\Gamma + (2m_1 + 1)\pi, 2\Gamma + 2m_2\pi, \ldots, 2\Gamma + 2m_{N-1}\pi, 2\Gamma + 2m_N\pi$
$n_1\pi \pm k_1, 2n_2\pi \pm k_2, 2n_3\pi \pm k_3, \ldots, 2n_{N-1}\pi \pm k_{N-1}, 2n_N\pi \pm k_N,$
$n_{N+1}\pi \pm k_{N+1}$

| Input | Output | Channel | Dispersion |
|---|---|---|---|
| 1 | 1 | even | + |
| 1 | 2 | odd | − |
| 2 | 1 | odd | + |
| 2 | 2 | even | − |

Wherein $m_1, m_2, \ldots, m_{N-1}, m_N, n_1, n_2, \ldots, n_N,$ and $n_{N+1}$ are integers (0, ±1, ±2, ±3, …).

TABLE VI

Configuration, channelization, and dispersion of an MZI assembly.

$2\Gamma + 2m_N\pi, 2\Gamma + 2m_{N-1}\pi, \ldots, 2\Gamma + 2m_2\pi, \Gamma + (2m_1 + 1)\pi$
$n_{N+1}\pi \pm k_{N+1}, 2n_N\pi + k_N, 2n_{N-1}\pi \pm k_{N-1}, \ldots, 2n_3\pi \pm k_3, 2n_2\pi \pm k_2,$
$n_1\pi \pm k_1$

| Input | Output | Channel | Dispersion |
|---|---|---|---|
| 1 | 1 | even | + |
| 1 | 2 | odd | + |
| 2 | 1 | odd | − |
| 2 | 2 | even | − |

Wherein $m_1, m_2, \ldots, m_{N-1}, m_N, n_1, n_2, \ldots, n_N,$ and $n_{N+1}$ are integers (0, ±1, ±2, ±3, …).

TABLE VII

Configuration, channelization, and dispersion of an MZI assembly.

$\Gamma + (2m_1 + 1)\pi, 2\Gamma + 2m_2\pi, \ldots, 2\Gamma + 2m_{N-1}\pi, 2\Gamma + 2m_N\pi$
$(2n_1 + 1)\pi/2 \pm k_1, (2n_2 + 1)\pi \pm k_2, (2n_3 + 1)\pi \pm k_3, \ldots, (2n_{N-1} + 1)\pi \pm k_{N-1}, (2n_N + 1)\pi \pm k_N, (2n_{N+1} + 1)\pi/2 \pm k_{N+1}$

| Input | Output | Channel | Dispersion |
|---|---|---|---|
| 1 | 1 | even | − |
| 1 | 2 | odd | + |
| 2 | 1 | odd | − |
| 2 | 2 | even | + |

Wherein $m_1, m_2, \ldots, m_{N-1}, m_N, n_1, n_2, \ldots, n_N,$ and $n_{N+1}$ are integers (0, ±1, ±2, ±3, …).

TABLE VIII

Configuration, channelization, and dispersion of an MZI assembly.

$2\Gamma + 2m_N\pi$, $2\Gamma + 2m_{N-1}\pi$, ..., $2\Gamma + 2m_2\pi$, $\Gamma + (2m_1 + 1)\pi$
$(2n_{N+1} + 1)\pi/2 \pm k_{N+1}$, $(2n_N + 1)\pi \pm k_N$, $(2n_{N-1} + 1)\pi \pm k_{N-1}$, ..., $(2n_3 + 1)\pi \pm k_3$, $(2n_2 + 1)\pi \pm k_2$, $(2n_1 + 1)\pi/2 \pm k_1$

| Input | Output | Channel | Dispersion |
|-------|--------|---------|------------|
| 1 | 1 | even | − |
| 1 | 2 | odd | − |
| 2 | 1 | odd | + |
| 2 | 2 | even | + |

Wherein $m_1, m_2, \ldots, m_{N-1}, m_N, n_1, n_2, \ldots, n_N$, and $n_{N+1}$ are integers $(0, \pm 1, \pm 2, \pm 3, \ldots)$.

From Equation (1), the coupling coefficient k of a two-port coupler is related to the definition of both the input ports 1, 2 (or 1i and 2i in $E_{1i}$, $E_{2i}$, where i refers to input) and the output ports 1, 2 (or 1o and 2o in $E_{1o}$, $E_{2o}$, where o refers to output). For easy discussion, the concept of construct complementary and equivalent couplers are introduced here. Under this port definition, we can construct complementary and equivalent couplers. For the same numbered input port and the same numbered output port, if two couplers have the same (or substantially the same) transmission and dispersion characteristics, they are equivalent couplers. For the same numbered input port and the same numbered output port, if two couplers have the same (or substantially the same) transmission characteristics but flipped (or substantially flipped) dispersion characteristics with respect to each other, they are complementary couplers. From Equation (1), one can conclude that if k is replaced by $n\pi \pm k$ then it results in equivalent couplers and if k is replaced by $(2n+1)\pi/2 \pm k$ then it results in complementary couplers (where $n=0, \pm 1, \pm 2, \ldots$).

For Equation (1), if input ports are defined differently (input port 1 is defined as input port 2 and input port 2 is defined as input port 1), the transfer matrix as well as the coupling coefficient k will show a new format as described below. From Eq. (1), one can get:

$$\begin{bmatrix} E_{1o} \\ E_{2o} \end{bmatrix} = \begin{bmatrix} \cos(k) & -j\sin(k) \\ -j\sin(k) & \cos(k) \end{bmatrix} \begin{bmatrix} E_{1i} \\ E_{2i} \end{bmatrix} = \begin{bmatrix} \cos(k)E_{1i} - j\sin(k)E_{2i} \\ -j\sin(k)E_{1i} + \cos(k)E_{2i} \end{bmatrix} = \begin{bmatrix} -j\sin(k)E_{2i} + \cos(k)E_{1i} \\ \cos(k)E_{2i} - j\sin(k)E_{1i} \end{bmatrix} = \begin{bmatrix} -j\sin(k) & \cos(k) \\ \cos(k) & -j\sin(k) \end{bmatrix} \begin{bmatrix} E_{2i} \\ E_{1i} \end{bmatrix} \quad (10)$$

Eq. (10) can be further written as:

$$\begin{bmatrix} E_{1o} \\ E_{2o} \end{bmatrix} = -j \begin{bmatrix} \sin(k) & j\cos(k) \\ j\cos(k) & \sin(k) \end{bmatrix} \begin{bmatrix} E_{2i} \\ E_{1i} \end{bmatrix} = -j \begin{bmatrix} \sin(k) & j\cos(k) \\ j\cos(k) & \sin(k) \end{bmatrix} \begin{bmatrix} E_{1'i} \\ E_{2'i} \end{bmatrix} \quad (11)$$

For Eq. (11), the new input ports are 1' (the original input port 2) and 2' (the original input port 1). The new transfer matrix is shown in Eq. (11) which can be obtained from the original matrix (Eq. (1)) by replacing k with $(2n+1)\pi/2 \pm k$.

Above discussion is for input port exchange. For output ports, similar results can be obtained when the definition of output ports is exchanged. Thus, both input port exchange and output port exchange can be treated as k is replaced by $(2n+1)\pi/2 \pm k$. For an MZI assembly, this argument applys to each coupler used in the assembly.

Thus, for the same physical device, depending upon how the ports are defined, one can determine a plurality of different transfer functions (matrix) that are equivalent. Since the transfer functions are equivalent, other matrix for all different port definitions are implicitly covered by Tables I–VIII.

The phase delay $\Gamma$ can be either positive or negative in an interleaver element of an MZI assembly as we discussed above. In a special case that all phase delays are replaced by their corresponding negative values (which is equivalent to moving the phase delay loop from one leg of an unbalanced Mach-Zehnder interferometer to the other leg thereof) it results in a complementary interleaver element. Similar to the derivation of Eq. (11), one can show that if the sign of phase delay of a phase delay element in an MZI assembly is changed, the coupling coefficient k for the coupler "immediate before" and the coupler "immediate after" the phase delay element can be replaced by $(2n+1)\pi/2 \pm k$ in the original transfer matrix in order to get the new transfer matrix.

Thus, for the same physical device, depending upon how the sign of phase delay and the coupling coefficients are defined, one can determine a plurality of different transfer functions (matrix) that are equivalent. Since the transfer functions are equivalent, matrix for different definitions of sign of phase delay and corresponding coupling coefficients are implicitly covered by Tables I–VIII as well.

FIG. 55 actually shows an example under different port definition. That is, a device of FIG. 55 is not explicitly covered by Tables I–VIII above. But, a device of FIG. 55 is implicitly covered by Tables I–VIII, since by using different port definition, a new table can be obtained for the device, where the new table belong to one of Tables I–VIII.

Phase delay $\Gamma$ is a measure of the relative change in phase for two optical beams and is wavelength dependent in general. However, in the range of interested wavelength (near 1550 nm for example), a small amount of phase change can be considered as wavelength independent. A full wavelength shift in optical path length can be considered as $2\pi$ in phase shift. This assumption gives the simplicity to treat the mathematic formulas without introduce unacceptable errors. Consider all parameters used in all tables, it is typical that $2 m_1\pi, 2 m_2\pi, \ldots, 2 m_{N-1}\pi, 2 m_N\pi, 2n_1\pi, 2n_2\pi, \ldots, 2n_N\pi$, and $2n_{N+1} \pi << \Gamma$.

Although we have used the 50 GHz interleaver as an example to illustrate the basic concept of this invention, this invention is applicable to interleavers having other channel spacings. The interleavers (with different channel spacing) can be used in series to further interleave the interleaved channels.

In the examples discussed above, interleavers configured as demultiplexers were discussed. However, those skilled in the art will appreciate that such interleavers may also be configured so as to facilitate multiplexing. Thus, the present invention may be utilized in both demultiplexing and multiplexing applications so as to facilitate the construction of such devices with mitigated dispersion.

Although the interleavers discussed above may be made out of optical fibers, the interleavers can alternatively be constructed by using other optical waveguide technologies. For example, the interleavers can be made with integrated optical waveguides based on planar semiconductor optical waveguides (silicon, III–V, quartz, etc.). They also can be made of optical waveguides based on lithium niobate technologies, etc.

It is understood that the exemplary interleavers described herein and shown in the drawings represent only presently preferred embodiments of the invention. Indeed, various modifications and additions may be made to such embodiments without departing from the spirit and scope of the invention. For example, various different types of waveguides, optical fibers, and/or other optical conduits, including those utilizing mirrors and/or prisms may be utilized in the construction of the unbalanced MZI assemblies of the present invention. Further, as those skilled in the art will appreciate, various different methods for obtaining the desired delays are contemplated. For example, the desired delays may be obtained by utilizing various different light transmissive materials and/or path lengths. Thus, various different interferometic devices may be utilized to obtain the desired delays. The use of unbalanced MZI assemblies herein as interferometic devices is by way of example only and not by of limitation.

Further, those skilled in the art will appreciate that various means for facilitating coupling of the light between the two light paths of the unbalanced MZI assemblies are contemplated. For example, the degree of coupling may be varied by either varying the length of the coupler (longer interfaces or coupler lengths allowing greater coupling) and/or by interposing different materials within the interface between the two optical elements being coupled. Thus, these and other modifications and additions may be obvious to those skilled in the art and may be implemented to adapt the present invention for use in a variety of different applications.

What is claimed is:

1. A dispersion mitigating interleaver assembly comprising:

a first Mach-Zehnder interferometer assembly having two input ports and having two output ports, the first Mach-Zehnder interferometer assembly being configured to receive an input to one of the two input ports thereof;

a second Mach-Zehnder interferometer assembly having two input ports and having two output ports, the second Mach-Zehnder interferometer assembly receiving a first output of the first Mach-Zehnder interferometer assembly at an input port of the second Mach-Zehnder interferometer assembly which is opposite of the input port of the first Mach-Zehnder interferometer assembly at which the first Mach-Zehnder interferometer assembly received the input, the second Mach-Zehnder interferometer assembly providing an output on the same output port as the input port of the second Mach-Zehnder interferometer assembly which received the input; and a third Mach-Zehnder interferometer assembly having two input ports and having two output ports, the third Mach-Zehnder interferometer assembly receiving a second output of the first Mach-Zehnder interferometer assembly at an input port of the third Mach-Zehnder interferometer assembly which is opposite of the input port of the first Mach-Zehnder interferometer assembly at which the first Mach-Zehnder interferometer assembly received an input, the third Mach-Zehnder interferometer assembly providing an output on the opposite output port as the input port of the third Mach-Zehnder interferometer assembly which received an input.

2. The dispersion mitigating interleaver as recited in claim 1, wherein the first, second, and third Mach-Zehnder interferometer assemblies are configured to have substantially the same transmission and dispersion characteristics.

3. The dispersion mitigating interleaver as recited in claim 1, wherein the first, second, and third MZI assemblies have substantially the same coupling coffefficients and phase delays.

4. A dispersion mitigating interleaver comprising:

a first unbalanced Mach-Zehnder interferometer Assembly having two input ports and having two output ports, the first unbalanced Mach-Zehnder interferometer assembly being configured to receive an input to one of the two input ports thereof;

a second unbalanced Mach-Zehnder interferometer assembly having two input ports and having two output ports, the second unbalanced Mach-Zehnder interferometer assembly receiving a first output of the first unbalanced Mach-Zehnder interferometer assembly at an input port of the second unbalanced Mach-Zehnder interferometer assembly which is the same as the input port of the first unbalanced Mach-Zehnder interferometer assembly at which the first unbalanced Mach-Zehnder interferometer assembly received the input, the second unbalanced Mach-Zehnder interferometer assembly providing an output on the same output port as the input port of the second Mach-Zehnder interferometer assembly which received an input; and a third unbalanced Mach-Zehnder interferometer assembly having two input ports and having two output ports, the third unbalanced Mach-Zehnder interferometer assembly receiving a second output of the first unbalanced Mach-Zehnder interferometer assembly at an input port of the third unbalanced Mach-Zehnder interferometer assembly which is the same as the input port of the first unbalanced Mach-Zehnder interferometer assembly at which the first unbalanced Mach-Zehnder interferometer assembly received an input, the third unbalanced Mach-Zehnder interferometer assembly providing an output on an opposite output port as the input port of the third unbalanced Mach-Zehnder interferometer assembly which received an input.

5. The dispersion mitigating interleaver as recited in claim 4, wherein the first unbalanced Mach-Zehnder interferometer assembly is configured to be complementary in dispersion to the second and third unbalanced Mach-Zehnder interferometer assemblies.

6. The dispersion mitigating interleaver as recited in claim 4, wherein the first unbalanced MZI assembly is complementary to the second and third unbalanced MZI assmeblies and the second and third unbalanced MZI assemblies are equivalent to one another.

* * * * *